US012570387B1

(12) United States Patent　　(10) Patent No.: US 12,570,387 B1

Surma　　(45) Date of Patent: Mar. 10, 2026

(54) SYSTEMS AND METHODS FOR DETECTING WAVES USING A VISION SYSTEM OF A SECURED MARINE VESSEL AND CONTROLLING THE SECURED MARINE VESSEL BASED ON THE DETECTED WAVES

(71) Applicant: Brunswick Corporation, Mettawa, IL (US)

(72) Inventor: Eric T. Surma, Ormond Beach, FL (US)

(73) Assignee: Brunswick Corporation, Mettawa, IL (US)

( * ) Notice: Subject to any disclaimer, the term of this patent is extended or adjusted under 35 U.S.C. 154(b) by 201 days.

(21) Appl. No.: 18/500,519

(22) Filed: Nov. 2, 2023

(51) Int. Cl.
| | |
|---|---|
| *B63H 25/00* | (2006.01) |
| *B63B 79/00* | (2020.01) |
| *B63B 79/40* | (2020.01) |
| *B63H 25/04* | (2006.01) |
| *G05D 1/00* | (2024.01) |

(52) U.S. Cl.
CPC ............. *B63H 25/04* (2013.01); *B63B 79/40* (2020.01); *G05D 1/0206* (2013.01)

(58) Field of Classification Search
CPC ....... B63H 25/04; B63B 79/40; G05D 1/0206
USPC .......................................................... 701/21
See application file for complete search history.

(56) References Cited

U.S. PATENT DOCUMENTS

| | | | |
|---|---|---|---|
| 8,417,399 | B2 | 4/2013 | Arbuckle et al. |
| 10,372,976 | B2 | 8/2019 | Kollman et al. |
| 10,429,845 | B2 | 10/2019 | Arbuckle et al. |
| 11,247,753 | B2 | 2/2022 | Arbuckle et al. |
| 2021/0394877 | A1* | 12/2021 | Kadota ................... B63B 79/40 |

FOREIGN PATENT DOCUMENTS

| | | | | | |
|---|---|---|---|---|---|
| CN | 106990404 | A | * | 7/2017 | ........... G01S 13/882 |
| CN | 117146783 | A | * | 12/2023 | ........... G01C 13/004 |
| JP | 2017058322 | A | * | 3/2017 | |
| WO | WO-2019180920 | A1 | * | 12/2023 | ............. B63B 79/15 |

OTHER PUBLICATIONS

English translation of WO2019180920 (Year: 2019).*
English translation of JP2017058322 (Year: 2015).*

* cited by examiner

*Primary Examiner* — Tiffany P Young

(74) *Attorney, Agent, or Firm* — Andrus Intellectual Property Law, LLP

(57) ABSTRACT

A system includes a vision system camera mounted to a marine vessel with an associated field of view of the vessel's environment. The system receives image data from the camera and identifies waves in the marine vessel's environment based on the image data. When the system determines that a wave's height exceeds a threshold and that the current heading of the marine vessel is misaligned with the wave's heading, the system automatically adjusts the vessel's heading to align more closely with the wave's heading.

22 Claims, 7 Drawing Sheets

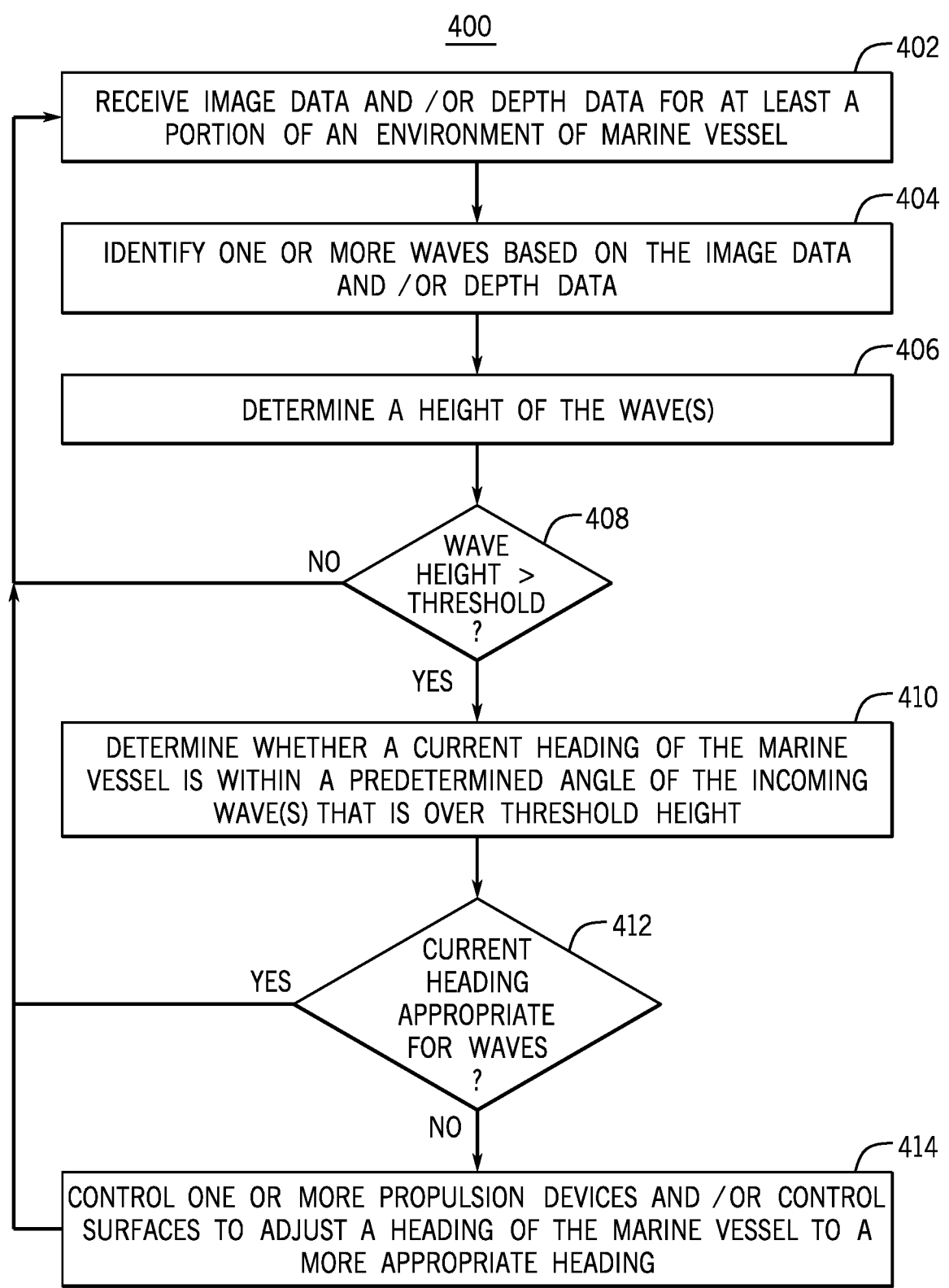

400

402

RECEIVE IMAGE DATA AND /OR DEPTH DATA FOR AT LEAST A PORTION OF AN ENVIRONMENT OF MARINE VESSEL

404

IDENTIFY ONE OR MORE WAVES BASED ON THE IMAGE DATA AND /OR DEPTH DATA

406

DETERMINE A HEIGHT OF THE WAVE(S)

408

WAVE HEIGHT > THRESHOLD ?

NO

YES

410

DETERMINE WHETHER A CURRENT HEADING OF THE MARINE VESSEL IS WITHIN A PREDETERMINED ANGLE OF THE INCOMING WAVE(S) THAT IS OVER THRESHOLD HEIGHT

412

CURRENT HEADING APPROPRIATE FOR WAVES ?

YES

NO

414

CONTROL ONE OR MORE PROPULSION DEVICES AND /OR CONTROL SURFACES TO ADJUST A HEADING OF THE MARINE VESSEL TO A MORE APPROPRIATE HEADING

FIG. 4

SYSTEMS AND METHODS FOR DETECTING WAVES USING A VISION SYSTEM OF A SECURED MARINE VESSEL AND CONTROLLING THE SECURED MARINE VESSEL BASED ON THE DETECTED WAVES

FIELD

The present disclosure generally relates to systems and methods for detecting waves using a vision system of a secured marine vessel and controlling the secured marine vessel based on the detected waves.

BACKGROUND

The following U.S. Patents are incorporated herein by reference, in entirety:

U.S. Pat. No. 8,417,399 discloses systems and methods for orienting a marine vessel to minimize at least one of pitch and roll in a station keeping mode. A plurality of marine propulsion devices are controlled to maintain orientation of a marine vessel in a selected global position and heading. A control device receives at least one of actual pitch and actual roll of the marine vessel in the global position. The control device controls operation of the marine propulsion units to change the heading of the marine vessel to minimize at least one of the actual pitch and the actual roll while maintaining the marine vessel in the selected global position.

U.S. Pat. No. 10,372,976 discloses an object detection system for a marine vessel having at least one marine drive including at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 10,429,845 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

U.S. Pat. No. 11,247,753 discloses a method for maintaining a marine vessel at a global position and/or heading. The method includes receiving measurements related to vessel attitude and estimating water roughness conditions based on the measurements. A difference between the vessel's actual global position and the target global position and/or a difference between the vessel's actual heading and the target heading are determined. The method includes calculating a desired linear velocity based on the position difference and/or a desired rotational velocity based on the heading difference. The vessel's actual linear velocity and/or actual rotational velocity are filtered based on the roughness conditions. The method includes determining a difference between the desired linear velocity and the filtered actual linear velocity and/or a difference between the desired rotational velocity and the filtered actual rotational velocity. The method also includes calculating vessel movements that will minimize the linear velocity difference and/or rotational velocity difference and carrying out the calculated movements.

SUMMARY

In accordance with some embodiments of the disclosed subject matter, a system for controlling a marine vessel based on waves detected using a vision system on the marine vessel is provided, the system comprising: a camera, wherein the camera is configured to be mounted to the marine vessel with an associated field of view of an environment of the marine vessel; one or more hardware processors configured to: receive image data from the camera; identify a wave in the environment of the marine vessel based on the image data; determine that a height of the wave exceeds a threshold; determine that a current heading of the marine vessel is misaligned with a heading of the wave; and automatically adjust a heading of the marine vessel to align more closely with the heading of the wave.

In some embodiments, the one or more hardware processors are further configured to: determine that the current heading of the marine vessel is misaligned with the heading of the wave by at least a threshold angle; and in response to determining that the current heading of the marine vessel is more than ten degrees out of alignment with the heading of the wave, determine that the current heading of the marine vessel is misaligned with the heading of the wave.

In some embodiments, the threshold angle is about ten degrees.

In some embodiments, the camera comprises a stereoscopic camera.

In some embodiments, the threshold is based on a height of a gunwale of the marine vessel.

In some embodiments, the system further comprises a plurality of cameras, including the camera.

In some embodiments, the one or more hardware processors are further configured to: determine whether the marine vessel is secured using a single anchor point; and control an angle of one or more steering devices based on a position of the single anchor point with respect to the marine vessel.

In some embodiments, the one or more steering devices comprises a steering actuator that controls an angle of a propulsion device.

In some embodiments, the one or more hardware processors are further configured to: determine a velocity of the wave, wherein the velocity is indicative of a heading of the wave and a speed of the wave; and automatically adjust the heading of the marine vessel to align more closely with the heading of the wave based on the velocity of the wave.

In some embodiments, the one or more hardware processors are further configured to: control an angle of a control surface of the marine vessel, thereby adjusting the heading of the marine vessel to align more closely with the heading of the wave.

In some embodiments, the one or more hardware processors are further configured to: control an angle of a propulsion device and thrust provided by the propulsion device, thereby adjusting the heading of the marine vessel to align more closely with the heading of the wave.

In some embodiments, the one or more hardware processors are further configured to: receive the image data from the camera while the marine vessel is underway.

In some embodiments, the one or more hardware processors are further configured to: receive additional image data from the camera; identify a second wave included in the additional image data; estimate a height of the second wave; determine that a current heading of the marine vessel is aligned with a heading of the second wave; receive one or more values indicative of pitch of the marine vessel during a period of time during which the second wave passed a position of the marine vessel; estimate a height of the second wave based on the one or more values indicative of pitch; determine a difference between the height of the second wave based on the image data and the height of the second wave based on the one or more values indicative of pitch; and in response to determining that the difference exceeds a threshold, generate a calibration alert.

In accordance with some embodiments of the disclosed subject matter, a method for controlling a marine vessel based on waves detected using a vision system on the marine vessel, the method comprising: receiving image data from a camera, wherein the camera is configured to be mounted to the marine vessel with an associated field of view of an environment of the marine vessel; identifying a wave in the environment of the marine vessel based on the image data; determining that a height of the wave exceeds a threshold; determining that a current heading of the marine vessel is misaligned with a heading of the wave; and automatically adjusting a heading of the marine vessel to align more closely with the heading of the wave.

In accordance with some embodiments of the disclosed subject matter, a system for monitoring calibration of a vision system on a marine vessel, the system comprising: a camera, wherein the camera is configured to be mounted to the marine vessel with an associated field of view of an environment of the marine vessel; one or more hardware processors configured to: receive image data from the camera; identify a wave included in the image data; estimate a height of the wave based on the image data; estimate a height of the wave based on one or more values indicative of movements of the marine vessel during a period of time during which the wave passed the marine vessel; determine a difference between the height of the wave based on the image data and the height of the wave based on the one or more values indicative of pitch; and in response to determining that the difference exceeds a threshold, generate a calibration alert.

In some embodiments, the one or more hardware processors are further configured to: determine that a current heading of the marine vessel is aligned with a heading of the wave; and estimate the height of the wave based on the one or more values indicative of pitch when the current heading is determined to be aligned with the heading of the wave.

Various other features, objects, and advantages of the disclosed subject matter can be more fully appreciated with reference to the following description taken together with the drawings.

BRIEF DESCRIPTION OF THE DRAWINGS

The present disclosure is described with reference to the following drawings.

FIG. 4 shows an example of a process for detecting waves using a vision system of a marine vessel and controlling the marine vessel based on the detected waves in accordance with some embodiments of the disclosure.

DETAILED DESCRIPTION

Boats can capsize or be swamped when in conditions where waves exceed gunwale height (e.g., when anchored or moored, when in an autonomous station keeping mode, when underway). The incident angle of the boat in reference to the waves (e.g., a difference between a heading of the boat and the heading of the waves) can increase this risk. Additionally, the likelihood of seasickness can also be related to movement of the boat (e.g., caused by waves). When not being actively operated, a heading of a boat is often influenced by wind, such that the heading of the boat is likely to align with the wind direction, especially when moored (e.g., to a mooring ball or using an anchor). Waves are often formed by wind, and a heading of a wave may align with a direction of the wind that caused the wave to form. However, wave direction does not always align with a local wind direction, and boats are typically wind-sensitive (e.g., a boat's heading is affected by the local wind direction). Waves caused by other phenomena (e.g., tides, earthquakes, mudslides, etc.) also may not align with local wind direction. Accordingly, a boat that is maintaining a position without active user intervention (e.g., moored directly with a rope to a mooring ball or anchor, or maintaining a position and/or heading automatically) is not configured to adjust a heading to a safer heading in a dynamic situation, which can increase a risk of the boat being swamped or capsized when a relatively large incoming wave(s) approaches from a direction that is misaligned with a heading of the boat (e.g., from the port of starboard side). While an experienced operator can take action to adjust the heading of the boat to a safer heading when a dynamic situation occurs, there is not always an experienced operator that can adjust the heading of the boat (such as when the vessel occupants are below deck sleeping and unable to react in real-time to changing weather).

In some embodiments, mechanisms described herein can utilize a perception system of a marine vessel (e.g., a vision system that utilizes depth cameras) to detect when a dangerous wave (e.g., a wave capable of swamping the vessel) is approaching the marine vessel, and automatically adjust a heading of the marine vessel to a safer heading (e.g., using one or more propulsion devices, using a control surface such as a rudder, etc.). Additionally or alternatively, in some embodiments, mechanisms described herein can compare a height of an incoming wave estimated using the perception system to a height of the wave estimated using acceleration and/or rotation information (e.g., from one or more accelerometers and/or gyroscopes). If the heights differ by more than a threshold amount, mechanisms described herein can indicate that calibration of the perception system may have degraded.

Figure 1:
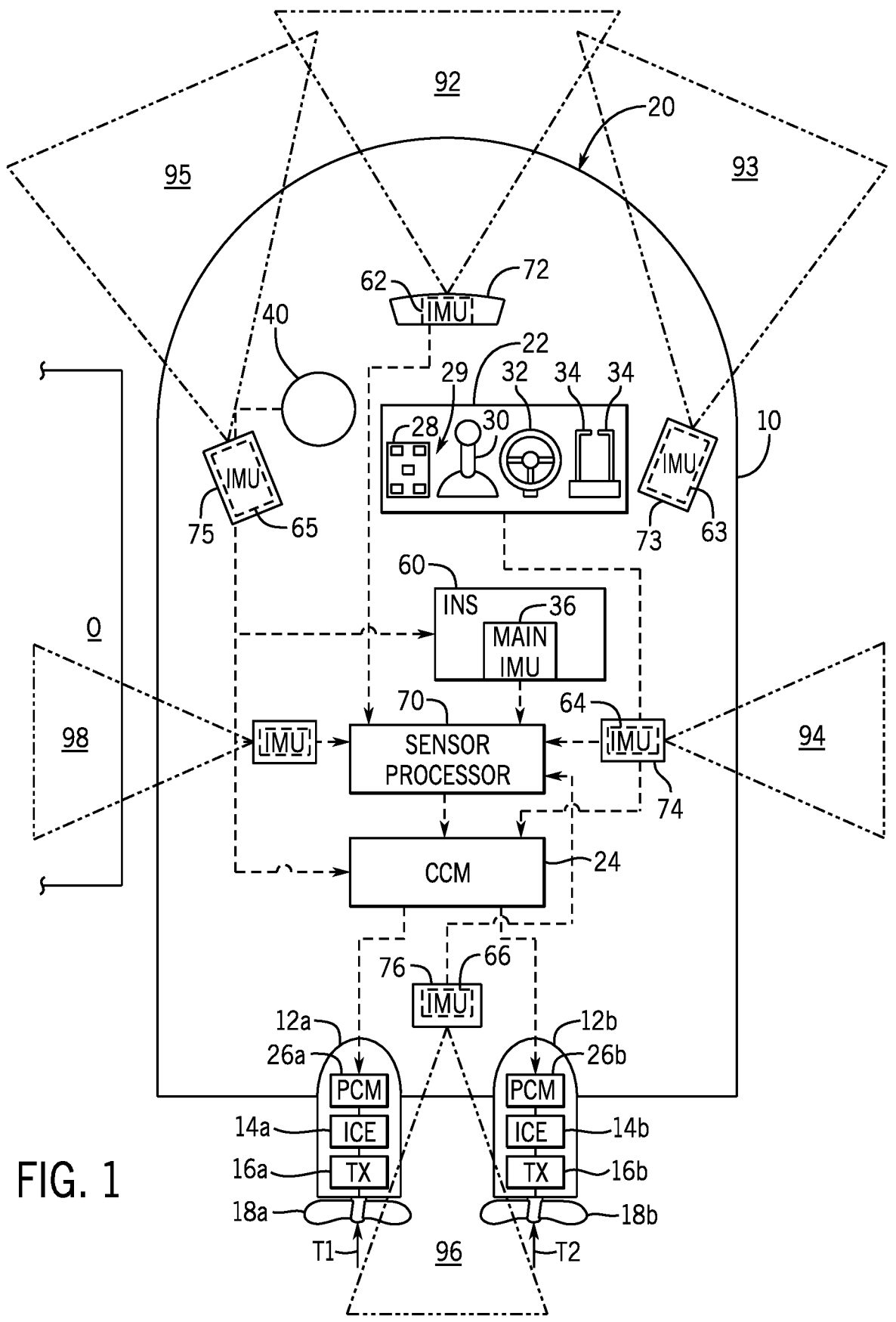
FIG. 1 shows an example of propulsion system on a marine vessel in accordance with some embodiments of the disclosure.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stern drives, jet drives, pod drives, any other suitable propulsion device, or combinations thereof. Each propulsion device can be provided with an engine 14a, 14b operatively connected to a transmission 16a, 16b, in turn, operatively connected to a propeller 18a, 18b.

In some embodiments, vessel 10 can also house various control elements that comprise part of the marine propulsion system 20. For example, marine propulsion system 20 can comprise an operation console 22 in signal communication, for example via a controller area network (CAN) bus (e.g., as described in U.S. Pat. No. 6,273,771), with a controller 24, such as a command control module (CCM), and with propulsion control modules (PCM) 26a, 26b associated with the respective propulsion devices 12a, 12b. Each of controller 24 and PCMs 26a, 26b can include memory and a programmable processor. Each control module 24, 26a, 26b can include one or more processors communicatively connected to a respective storage system comprising a computer-readable medium that includes volatile and/or non-volatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored. In some embodiments, each processor can access computer-readable code and, upon executing the code, carry out one or more functions, such as wave detection functions, heading adjustment functions, and/or calibration monitoring functions, as described in detail below.

In some embodiments, operation console 22 can include any suitable number of user input devices, such as, a keypad 28, a joystick 30, a steering wheel 32, one or more throttle/shift levers 34, and/or one or more display devices (e.g., one or more multi-function display). Each of these devices can be configured to input commands to controller 24, which can, in turn, communicate control instructions to first and second propulsion devices 12a, 12b by communicating with the PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators or other suitable steering devices to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (e.g., forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10.

In some embodiments, propulsion system 20 can also include one or more depth sensors 72, 73, 74, 75, 76, and 78. In some embodiments, depth sensors 72-78 can form a portion of a vision system associated with vessel 10 (although the vision system may be configured to use sensing modes other than visible light, such as sound-based sensing, radio-based sensing, infrared-based sensing, etc.). In some embodiments, the vision system can be referred to as a perception system. Although a limited number of depth sensors are shown (e.g., one perpendicular to each of the bow, stern, and port and starboard sides the vessel 10, and two positioned at an angle between the bow and sides), fewer or more sensors can be provided at each location and/or provided at other locations, such as on a hardtop of the vessel 10. In some embodiments, depth sensors 72-78 can be used to determine a three-dimensional location of an object and/or other feature of an environment (e.g., a wave) that is within a field of view (e.g., FOVs 92, 93, 94, 95, 96, and 98 shown in FIG. 1, associated with depth sensors 72, 73, 74, 75, 76, and 78 respectively) of the depth sensor with respect to the location of the depth sensor (e.g., distance to various points on an object and a direction associated with each of the various points with respect to the depth sensor). For example, depth sensors 72-78 can be implemented using one or more of depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of several to tens of centimeters (cm) at relatively close ranges on the order of several to tens of meters, such as an accuracy of about +/−3 cm at 5 meters (m) and +/−13 cm at 10 m for stereoscopic cameras), e.g., the relative position of various points on an object O (such as a wave, a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70)

using the location of object O and/or various points on object O determined by one or more of depth sensors 72-78.

In some embodiments, a calibration process can be performed to determine a set of transforms that can be used to convert a location from a local coordinate system used by a particular depth sensor (sometimes referred to herein as a camera coordinate system, although it can be a coordinate system used by another type of depth sensor, such as a lidar or sonar-based sensor) to the corresponding location in a global coordinate system used by vessel 10 (e.g., used to perform autonomous navigation processes, such as automatically guiding vessel 10 during docking, automatically guiding vessel 10 during trailer loading or unloading, automatically avoiding collisions with objects via a virtual bumper or buffer zone, autonomous navigation through areas that include other vessels and/or other obstacles, etc.). The camera coordinate system can define a local reference frame for a particular camera (or other type of depth sensor), and the global coordinate system can define a reference frame to which each camera (or other type of depth sensor) is calibrated, which can be referred to as a common reference frame, a global reference frame, or a world reference frame (note that the global coordinate system can be independent and distinct from the geographical coordinate system of latitude and longitude often used to designate locations on Earth).

In some embodiments, a camera coordinate system can be defined relative to a center of an imaging plane (e.g., with an origin at a center of the imaging plane, a depth axis extending perpendicular to the imaging plane, and lateral axes extending perpendicular to the depth axis) of the camera. In some embodiments, the camera coordinate system can use any suitable type of coordinate system, such as a 3D Cartesian coordinate system, a spherical coordinate system, a cylindrical coordinate system, etc. Note that the type of coordinate system used to define the camera coordinate system can vary based on the type of sensor being used. For example, depth cameras can use a Cartesian coordinate system that defines a depth axis (e.g., a z-axis) that extends perpendicular to the imaging plane of the camera (e.g., an imaging plane associated with an image sensor of the camera), and lateral coordinates (e.g., an x-axis and a y-axis) that extend parallel to the imaging plane and can be used to define the horizontal and vertical distance of a point from an optical axis of the camera. As another example, a scanning lidar that sweeps across a scene using a laser line or single laser point can use a cylindrical coordinate system that defines a depth axis (e.g., an r-axis) that extends perpendicular to the light detector(s) (e.g., an imaging plane associated with an area sensor, an imaging axis of a line sensor), and lateral coordinates (e.g., a z-axis and a θ coordinate) that can be used to define the angular distance (e.g., in degrees or radians) and vertical distance of a point from reference axes of the lidar system.

In some embodiments, a global coordinate system (sometimes referred to as global coordinates or world coordinates) can be defined relative to a particular point on vessel 10. For example, a coordinate system of a particular depth sensor can be used as the basis for the global coordinate system (e.g., a front-facing camera, such as depth sensor 72), and locations of points in an environment of vessel 10 can be defined based on the distance from an origin of that camera coordinate system. In such an example, an offset can be used to determine a location of a particular point on the vessel (e.g., a point of navigation, such as center of gravity (COG) or center of rotation (COR) of vessel 10). As another example, locations of points in an environment of vessel 10 can be defined based on the distance from a COG or COR of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensors FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of data produced by depth sensors 72-78, the connection between sensors 72-78 and sensor processor 70 can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network being used for communication by multiple devices. In some embodiments, sensor processor 70 can be configured to communicate filtered data (e.g., derived from data generated by depth sensors 72-78, but including significantly less data points) on the vessel network, such as a CAN bus or wireless network. Additionally or alternatively, a dedicated communication link can be provided between sensor processor 70 and a propulsion controller, such as central controller 24.

In some embodiments, depth sensors 72-78 can include different types of sensors (e.g., depending on the distance between vessel 10 and an object, such as object O). For example, radar sensors can be used to detect objects at further distances, and cameras, sonic sensors, and/or lidar can be used for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view (e.g., as shown in FIG. 1, and as described below in connection with FIG. 2). Note that optimal sensor positions can vary depending on vessel size and configuration.

In FIG. 1, the depth sensors shown are positioned to observe multiple regions around vessel 10, including the front, sides, and stern of vessel 10, and include a front-facing sensor 72, a front-starboard-facing sensor 73, a starboard-facing sensor 74, a front-port-facing sensor 73, a rear-facing sensor 76, a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10, such as where the hull obstructs the field of view). Note also that the relevant controller, such as sensor processor 70, can selectively operate any one or more of various different sensors (e.g., including depth cameras, radars, lidars, ultrasonics, or any other suitable sensor technology) to sense the location of objects in an environment of vessel 10.

In some embodiments, sensor processor 70 can integrate sensor data provided from one or more types of sensor into one or more models of an environment of vessel 10, objects within the environment, and/or vessel 10 itself. In such embodiments, the model(s) can be in any suitable format, such as one or more point clouds, one or more maps, one or more occupancy grids, and/or one or more data structures including a list of surrounding objects (e.g., including the object's size and position, the object's velocity), integrating location information from multiple sensors. As described above, the location data from different sensors can be translated into a common reference frame (e.g., defined by the global coordinate system). For example, the model(s) can include a list of waves in an environment of the marine vessel (e.g., including the waves height, distance from the vessel, and velocity). In such an example, a wave can be represented using any suitable information, such as a height (e.g., with respect to a ground plane or water surface plane, with respect to a gunwale of the vessel, etc.), a distance from the vessel at the time the wave was detected (e.g., a distance to a closest point on the wave), and a vector representing a velocity of the wave (e.g., the direction of the vector can represent a heading of the wave, and a magnitude can represent a speed of the wave) or a unit vector representing a heading of the wave and a scalar coefficient representing a speed of the wave. In some embodiments, an angle formed by a face of the wave can be determined, and can be included with information about the wave. For example, an angle of the face can be approximated based on a height difference between the wave trough and wave crest, and a lateral distance between the wave trough and wave crest (e.g., the wave face can be assumed to be a hypotenuse of a right triangle with the lateral distance forming another side of the triangle, and the height forming the last side of the triangle). As another example, an angle of the face can be determined based on a model of a surface of the water surface between the trough and crest of the wave.

Autonomous and/or advanced operator assistance (sometimes referred to as semi-autonomous) controls for improved vessel handling qualities generally requires a relatively accurate ability to identify objects in an environment of vessel 10, often using multiple depth sensors mounted on vessel 10. In general, such depth sensors can be positioned to detect the objects in the marine environment surrounding marine vessel 10, such as a dock, a swimmer, or other obstruction in the current path and/or other potential paths of vessel 10. Each sensor can provide location information of features within its field of view relative to its own frame of reference (e.g., in the camera coordinate system associated with that sensor) and/or in a common frame of reference (e.g., in the global coordinate system). For example, the location information can be transformed from the respective camera coordinates at the camera and/or at a controller (e.g., sensor processor 70) using one or more transforms derived during a calibration procedure. Depending on the type of sensor(s), the application of use, boat size, hull shape, etc., multiple sensor types and sensor locations may be required to provide adequate sensing around the marine vessel for operation in all marine environments. To create a cohesive dataset that can be used for purposes of vessel control and vessel navigation, including autonomous vessel navigation, autonomous station keeping, autonomous heading control, and automatic maneuver-limiting control (e.g., velocity limiting for object avoidance, maintenance of a buffer zone, etc.), information from multiple sources (e.g., multiple depth sensors, multiple types of depth sensors, proximity sensors, etc.) can be translated to a common reference frame. To accurately translate the information to the common reference frame typically requires precise knowledge of the posture (e.g., including 3D location, installation attitude, and/or orientation) of each sensor relative to the common reference frame such that the information received from each sensor can be translated appropriately. Regardless of what type of model(s) is being generated, the relevant sensor installation posture of each sensor on the marine vessel must be known so that the location information from each respective sensor can be properly interpreted for navigation purposes. Note that the installation posture of each sensor can be calculated or otherwise determined explicitly, however, such information is difficult to determine with sufficient accuracy. Alternatively, the installation posture of each sensor can be implicit in the transforms determined during a calibration procedure (e.g., transforms that are optimized using machine learning techniques may not require explicit knowledge of the location of the sensors). In some embodiments, a calibration procedure can begin with an initial estimate of camera poses (e.g., based on measurement and/or a CAD model), and the calibration procedure can include refining the initial estimate (e.g., via an optimization algorithm).

In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electro-mechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system, such as the global positioning system (GPS). GPS receiver 40 can be located at a pre-selected fixed position on vessel 10, which provides information related to a position of vessel 10 with respect to a planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, mechanisms described herein can be configured to estimate a height of a wave passing vessel 10 using data from one or more of depth sensors 72-78 and/or using data from one or more IMUs. For example, in some embodiments, each depth sensor 72, 73, 74, 75, 76, 78 can be associated with a respective IMU 62, 63, 64, 65, 66, 68 provided therewith at a known orientation relative to the view angle, or coordinate system frame, of the respective sensor 72-78. Each sensor IMU 62, 63, 64, 65, 66, 68 can provide IMU data describing linear acceleration, angular acceleration, attitude, and/or heading. For example, each sensor IMU 62-68 can include a rate gyro, an accelerometer, and a magnetometer, and thus the IMU data provided can include rate gyro measurements, accelerometer measurements, and magnetometer measurements. Each sensor IMU 62-68 can be incorporated within a housing of each depth sensor device 72-78, or can be a separately-housed device (e.g., located as close as possible to the respective depth sensor 72-78) installed at a known relative orientation thereto. Alternatively, in some embodiments, IMUs 62-68 can be configured to measure fewer or more parameters. For example, each camera can be associated with one or more accelerometers used to measure acceleration in various dimensions (e.g., three dimensions), and may not include a gyroscope and/or a magnetometer.

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with location information from the respective depth sensor 72-78. Additionally or alternatively, in some embodiments, each sensor IMU 62-68 can have an integrated microprocessor configured to process the respective sensor IMU data and determine a pitch and/or roll of the IMU based on the IMU data and estimate a pitch and/or roll of the vessel based on the pitch and/or roll of the IMUs. In some embodiments, as shown in FIG. 1, depth data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy, ZigBee, etc.), a CAN bus comprising part of the vessel network, etc. Note that the dashed lines between devices and/or control elements in FIG. 1 are meant to show only that the various devices and/or control elements are capable of communicating with one another, and do not necessarily represent actual wiring connections between the control elements, nor do they represent the only paths of communication between the elements.

In some embodiments, some sensor processing functions can be performed by a separate computing device. For example, sensor processor 70 can communicate processed sensor data to central controller 24, which can utilize the processed data for navigation functions and/or other vessel control functions. In some embodiments, sensor processor 70 can be a dedicated, special-purpose computing system configured to process depth data and/or IMU data from depth sensors 72-78, sensor IMUs 62-68, and/or main IMU 36. As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, automatic station keeping, automatic heading control, and/or other advanced operator assistance programs. In some embodiments, central controller 24 can also perform one or more sensor processing functions. Additionally or alternatively, in some embodiments, functions described herein as comprising part of the sensor processor functions can be distributed across two or more processing devices. For example, each depth sensor 72-78 can include one or more processors that are configured to perform certain functions (e.g., segmenting image data to classify one or more objects in the image, generating one or more RGBD images, identifying waves in the image data and/or depth data, generating one or more 3D depth maps, generating a point cloud corresponding to the 3D depth map, projecting points into a global coordinate system). As another example, each IMU 62-68 can include (or otherwise be associated with) one or more processors that are configured to perform calculations to interpret measured IMU data (such as to determine an attitude estimate for the respective IMU, to determine whether the sensor IMU data is inconsistent with main IMU data, etc.) and provide the interpreted IMU data to one or more other processing devices or controllers for execution of subsequent processing steps.

In some embodiments, sensor processor 70 can be programmed and/or otherwise configured to automatically perform a wave detection process and/or a sensor calibration monitoring process, in which sensor processor 70 can identify waves in an environment of the vessel (e.g., vessel 10) that may pose a danger to the vessel and/or one or more occupants of the vessel, and/or monitor a difference between wave heights estimated using data from depth sensors and wave heights estimated using data from IMU data. For example, as described below in connection with FIGS. 4 and/or 5, sensor processor 70 can identify points corresponding to particular portions of a wave (e.g., from image data, RGBD data, and/or point cloud data generated by depth sensors), and estimate one or more dimensions of the wave (e.g., a height of the wave) based on the points. In such an example, sensor processor 70 can compare the estimated wave height determined from the image data and/or depth data points to a gunwale height (e.g., a distance between the water line and the top of the gunwale) and/or a height based on the gunwale height (e.g., a threshold portion of the gunwale height). In such an example, sensor processor 70 (and/or any other suitable processor) can determine whether a wave in the environment poses a danger to the vessel (e.g., based on the wave height exceeding a particular portion of the gunwale height), and if such a wave exists in the environment, a controller (e.g., CCM 24) can automatically adjust a heading of the vessel to a heading that is less likely to result in the wave swamping and/or capsizing the vessel. As another example, as described below in connection with FIG. 6, sensor processor 70 (and/or any other suitable processor) can determine whether the vessel is secured (e.g., via an anchor or mooring ball), and can determine whether a risk to the boat from the wave is large enough to justify the cost associated with adjusting the heading when the vessel is secured (e.g., as such adjustments can be expected to be more costly in time and/or fuel due to the vessel being anchored and additional maneuvers that may be required to avoid the anchor point and/or lines used to secure the vessel to the anchor point). As yet another example, as described below in connection with FIG. 7, sensor processor 70 (and/or any other suitable processor) can estimate a height of waves using linear and/or rotational acceleration data (e.g., when the vessel is determined to be aligned with the waves), and can compare that measurement to a height of the wave estimated based on data generated from one or more of depth sensors 72-78. In such an example, a large disagreement between the heights (e.g., over a threshold difference) can indicate that a calibration of the perception system and/or one or more IMUs has degraded.

Figure 2:
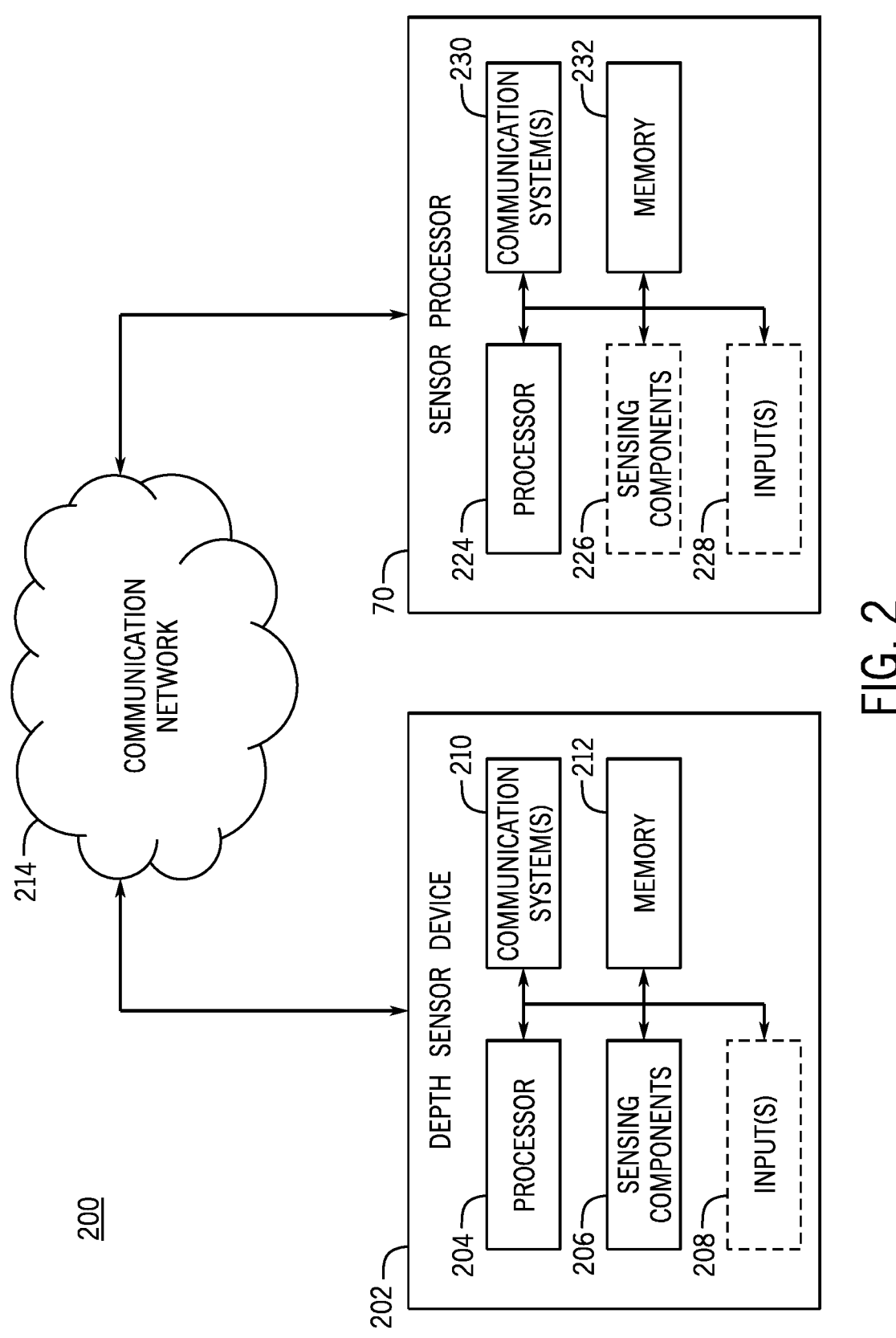
FIG. 2 shows an example of a system for hardware that can be used to implement a sensor device and sensor processor in accordance with some embodiments of the disclosure.

FIG. 2 shows an example of hardware 200 that can be used to implement a depth sensor device 202 and sensor processor 70 in accordance with some embodiments of the disclosed subject matter.

As shown in FIG. 2, in some embodiments, sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), etc.

In some embodiments, sensing components can include components that are used to determine a three-dimensional location of an object (e.g., a wave) and/or other feature of an environment (e.g., a water surface) that is within a field of view of the depth sensor device 202. In some embodiments, depth sensor device 202 can include components used to implement one or more of depth sensors 72-78.

For example, depth sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, depth sensor device 202 can be implemented as one or more lidar devices (e.g., a scanning lidar, a lidar including a 2D array sensor, etc.) that include components that facilitate three-dimensional characterization of a region of an environment. In such an example, a camera(s) (e.g., a two-dimensional camera) can be located to have an overlapping field of view with a lidar device (e.g., such a camera can be co-located), and can be used to capture images that can be used to classify portions of the environment (e.g., using a machine learning model trained to perform image segmentation, object detection, etc.). As yet another example, depth sensor device 202 can be implemented as one or more sound-based devices (e.g., one or more sonar systems, etc.) that include components that facilitate three-dimensional characterization of a region of an environment. As still another example, depth sensor device 202 can be implemented as one or more radio wave-based devices (e.g., one or more radar systems, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, depth sensor device 202 can omit inputs (e.g., where depth sensor device is an embedded device, or where depth sensor device 202 is not configured for direct end user operation).

In some embodiments, communications systems 210 can include any suitable hardware, firmware, and/or software for communicating information over a communication network 214 and/or any other suitable communication networks. For example, communications systems 210 can include one or more transceivers, one or more communication chips and/or chip sets, etc., that can be used to establish a wired and/or wireless communication link. In a more particular example, communications systems 210 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 212 can include any suitable storage device or devices that can be used to store instructions, values, etc., that can be used, for example, by processor 204 to generate depth information of a portion of the environment that characterizes the portion of the environment in three-dimensions, to identify and/or classify one or more objects and/or other features in a scene based on the depth information and/or image information, to communicate with sensor processor 70 via communications system(s) 210, etc. Memory 212 can include any suitable volatile memory, non-volatile memory, storage, or any suitable combination thereof. For example, memory 212 can include random access memory (RAM), read-only memory (ROM), electronically erasable programmable read-only memory (EEPROM), one or more flash drives, one or more hard disks, one or more solid state drives, one or more optical drives, etc. In some embodiments, memory 212 can have encoded thereon a computer program for controlling operation of depth sensor device 202. In such embodiments, processor 204 can execute at least a portion of the computer program to generate depth information, to identify and/or classify one or more objects and/or other features in a scene based on the depth information and/or image information, to transmit information to sensor processor 70, to execute at least a portion of a process for estimating a dimension(s) of detecting and/or measuring waves, and/or a process for monitoring calibration of a vision system based on a location of one or more fixed point(s) of the vessel, such as processes described below in connection with FIGS. 4-7, etc.

In some embodiments, depth sensor device 202 can include any suitable display device(s) (not shown), such as a computer monitor, a touchscreen, a television, etc., or may not include any display.

In some embodiments, communication network 214 can be any suitable communication network or combination of communication networks. For example, communication network 214 can include a Wi-Fi network (which can include one or more wireless routers, one or more switches, and the like), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, sensor processor 70 can include a processor 224, a display 226, one or more inputs 228, one or more communications systems 230, and/or memory 232. In some embodiments, processor 224 can be any suitable hardware processor or combination of processors, such as a CPU, an APU, a GPU, an FPGA, an ASIC, etc. In some embodiments, display 226 can include any suitable display devices, such as a computer monitor, a touchscreen, a television, etc. In some embodiments, inputs 228 can include any suitable input devices and/or sensors that can be used to receive user input, such as a keyboard, a mouse, a touchscreen, a microphone, etc. In some embodiments, sensor processor 70 can omit inputs (e.g., where sensor processor 70 is an embedded device that is not configured for direct user interaction). For example, sensor processor 70 can provide results of an analysis to CCM 24, and CCM 24 can use the results to provide an alert (e.g., via a user interface, via a message to a connected device such as a technician laptop or tablet computer, etc.), assist with autonomous control and/or advanced operator assistance control, etc.

In some embodiments, communications systems 230 can include any suitable hardware, firmware, and/or software for communicating information over communication network 214 and/or any other suitable communication networks. For example, communications systems 230 can include one or more transceivers, one or more communication chips and/or chip sets, etc., that can be used to establish a wired and/or wireless communication link. In a more particular example, communications systems 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 232 can include any suitable storage device or devices that can be used to store instructions, values, etc., that can be used, for example, by processor 224 to analyze depth information received from depth sensor device 202 (and/or any other suitable depth sensor device), to identify and/or classify one or more objects and/or other features in a scene based on the depth information and/or image information (e.g., one or more waves), to communicate with depth sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, and the like. In some embodiments, memory 232 can have encoded thereon a computer program for controlling operation of sensor processor 70. In such embodiments, processor 224 can analyze depth information to identify and/or classify one or more objects and/or other features in a scene based on the depth information and/or image information, to receive information from depth sensor device 202, to execute at least a portion of a process for estimating a height of a wave(s) and adjusting a heading of the vessel to a more appropriate heading when the wave(s) is determined to be over a threshold height (e.g., based on a gunwale height of the vessel), and/or a process for monitoring calibration of a vision system based on a wave height estimated based on data from the vision system and a wave height estimated based on data from one or more IMU(s) of the vessel, such as processes described below in connection with FIGS. 4-7, etc.

Figure 3:
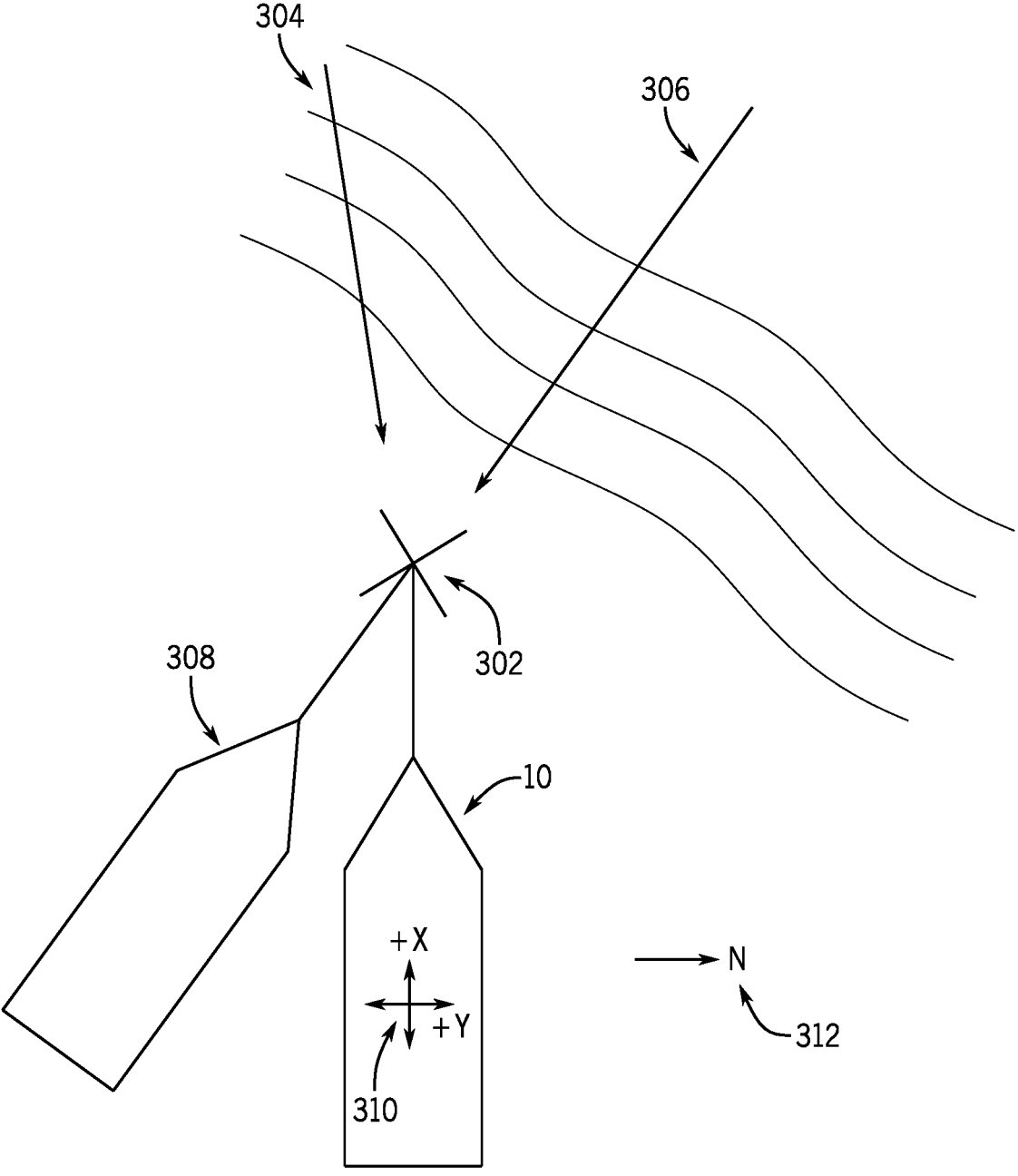
FIG. 3 shows an example of a vessel that can be controlled based on a heading of detected waves in accordance with some embodiments of the disclosure.

FIG. 3 shows an example of a vessel that can be controlled based on a heading of detected waves in accordance with some embodiments of the disclosure. In some embodiments, mechanisms described herein can As shown in FIG. 3, a heading of a vessel (e.g., vessel 10) that is secured to an anchor point 302 (e.g., where an anchor is secured to a bed of the body of water) can be influenced by a heading 304 of the wind. For example, as shown in FIG. 3, a heading of vessel 10 can be expected to shift to be opposite of a heading of the wind (e.g., opposite of heading 304). If the vessel has a different heading, the wind can be expected to exert more force on a side of the vessel facing the wind, causing the vessel to rotate around anchor point 302. A heading 306 of waves in the environment of vessel 10 may not be aligned with heading 304 of the wind. For example, a primary heading of the waves can be caused by non-local winds and/or another phenomenon (e.g., tides, an earthquake, etc.).

In some embodiments, mechanisms described herein can identify one or more waves in the environment of vessel 10, and can determine a height of the waves based on image data and/or depth data generated by a vision system of vessel 10. Additionally, mechanisms described herein can determine a heading of the one or more waves in the environment of vessel 10 (e.g., using any suitable technique, such as tracking movement of a wave(s), based on a shape of the wave, which can generally be expected to travel perpendicular to a long axis of the wave, etc.). If the height of the wave(s) is relatively large (e.g., at least about the height of the gunwale of vessel 10), mechanisms described herein can adjust a heading of vessel 10 to a new position 308 with a heading that is more appropriate for the heading of the wave(s), such as a heading opposite a heading of the wave(s). In some embodiments, adjusting the heading of the vessel can improve safety (e.g., by reducing a likelihood that the wave(s) will swamp and/or capsize vessel 10) and/or comfort (e.g., by reducing the amount of roll experienced by occupants of the vessel).

In some embodiments, the global coordinate frame can be associated with various axes 310 (e.g., that define locations in Cartesian coordinates). For example, a common vessel frame used in marine applications uses +x as points forward of the origin and −x as points aft of the origin (e.g., parallel to the keel), +y as points to starboard of the origin and −y as points to port of the origin, and +z as points down from the origin and −z as points up from the origin (note that the z-axis is not shown in FIG. 3).

In some embodiments, a heading of vessel 10 and heading 306 of waves can be defined in any suitable coordinate system(s). For example, in some embodiments, a heading of vessel 10 can be constant in the global coordinate system by definition, if the axes of the global coordinate system are defined with reference to the vessel. In such an example, the heading of the waves can be determined within the global coordinate system, and can be recalculated and/or transformed within the global coordinate system as vessel 10 changes heading (e.g., with respect to a geographic coordinate system). In such an example, a wave heading of zero degrees (0°) can correspond to waves moving in the +x direction (e.g., such waves can be expected to first impact the stern of vessel 10 and move away from the bow of vessel 10), a wave heading of 90° can correspond to waves moving in the +y direction (e.g., such waves can be expected to first impact the port side of vessel 10 and move away from the starboard side of vessel 10), a wave heading of 180° can correspond to waves moving in the −x direction (e.g., such waves can be expected to first impact the bow of vessel 10 and move away from the stern of vessel 10), etc. In such an example, a wave heading of 180° in the global coordinate system can be expected to result in a reduced risk of swamping when relatively large waves are present, as the vessel can be expected to pitch up as the wave approaches such that the gunwales stay relatively close to parallel to a face of the wave as the wave moves from the bow to the stern.

As another example, a heading of vessel 10 can be defined with respect to a reference direction 312 (e.g., true north, magnetic north, compass north, etc.), and heading 306 of waves can also be defined with respect to the same reference direction (e.g., a measurement of heading 306 of the waves in the global coordinate frame can be transformed into a heading with respect to the reference direction). In such an example, as the vessel heading changes (e.g., due to wind, due to control of the vessel using one or more propulsion devices and/or control surfaces, etc.) the vessel heading can be updated, and wave heading 306 can remain relatively fixed (e.g., if the wave heading remains relatively fixed over the time period corresponding to the vessel heading change). In such an example, a wave heading of 0° can correspond to waves moving in reference direction 312 (e.g., such waves can be expected to move from south to north), a wave heading of 90° can correspond to waves moving in a direction perpendicular to reference direction 312 (e.g., such waves can be expected to move from west to east), a wave heading of 1800 can correspond to waves moving opposite reference direction 312 (e.g., such waves can be expected to move from north to south), etc. In such an example, a wave heading that is opposite the boat heading can be expected to result in a reduced risk of swamping when relatively large waves are present, as the vessel can be expected to pitch up as the wave approaches and passes the bow.

FIG. 4 shows an example of a process 400 for detecting waves using a vision system of a marine vessel and controlling the marine vessel based on the detected waves in accordance with some embodiments of the disclosure.

At 402, process 400 can receive image data, depth data, and/or any other suitable data that can be used to identify waves in an environment of a marine vessel. In some embodiments, process 400 can receive the image data, depth data, and/or other suitable data from any suitable source (e.g., one or more cameras, memory associated with one or more cameras, memory associated with a sensor processor, etc.), and/or can cause the image data, depth data, and/or other suitable data to be captured or otherwise generated.

In some embodiments, process 400 can include capturing image data using any suitable type of camera(s), and/or any suitable number of cameras, and/or receiving image data from any suitable type of camera(s), and/or any suitable number of cameras. For example, as described above, in some embodiments, process 400 can include capturing images and/or depth data with one or more of depth sensors 72-78, such as stereoscopic cameras, structured light cameras, continuous-wave time-of-flight cameras, direct time-of-flight cameras, etc., and/or receiving images and/or depth data from such cameras. In some embodiments, cameras used to capture image data and/or depth data at 402 can capture information in various portions of the electromagnetic spectrum. For example, cameras that generate the image data received at 402 can capture information using light in the visible spectrum (e.g., with wavelengths in a range of about 380 to 700 nanometers (nm)). As another example, cameras that generate the image data received at 402 can capture information using light outside the visible spectrum (e.g., in the infrared portion of the spectrum, such as near-infrared, in the ultraviolet portion of the spectrum).

In some embodiments, process 400 can capture and/or receive 3D information of an environment of a marine vessel with multiple depth sensors having different fields of view, and that use a non-imaging technology. For example, process 400 can receive 3D information of an environment of a marine vessel generated using lidar. As another example, process 400 can receive 3D information of an environment of a marine vessel generated using radar. As yet another example, process 400 can receive 3D information of an environment of a marine vessel generated using sonar.

Additionally or alternatively, in some embodiments, process 400 can include capturing and/or receiving one or more images with a non-depth sensing camera, such as a conventional two-dimensional digital camera (e.g., that outputs RGB images).

In some embodiments, the image data and/or depth data received at 402 can be image data and/or depth data that are captured for an explicit purpose other than identifying waves, estimating wave heights, and/or determining a heading of waves in an environment of the marine vessel. For example, the images can be captured to perform machine vision processes (e.g., to facilitate autonomous navigation, obstacle avoidance, etc.). Accordingly, process 400 can leverage image data, depth data, and/or other suitable data, captured for another purpose and can utilize the data to identify waves, estimate wave heights, and/or determine a heading of waves (e.g., reducing computational resources dedicated to monitoring calibration health).

At 404, process 400 can identify one or more waves based on the image data, depth data, and/or other suitable data using any suitable technique or combination of techniques. In some embodiments, process 400 can analyze image data (e.g., 2D or 3D image data generated by a depth sensor, such as depth sensor 72-78) to identify waves using any suitable technique or combination of techniques. For example, in some embodiments, process 400 can use one or more trained machine learning models that have been trained to identify waves based on images of water, and/or to identify water in an image. In such an example, the machine learning model can be trained using any suitable data such as 2D or 3D image data that includes water having waves, with information identifying different portions of the images (e.g., labels, such as a segmentation mask, bounding boxes, etc.) that correspond to different parts of the waves, such as a trough, a crest, a face of the wave, a tube, whitecaps, whitewater, a shoulder, curl, etc. In such an example, a label associated with points in the image data (e.g., pixels) can indicate which points are likely to be water and/or a water surface of a body of water, and accordingly may include a wave. Such information can be used to filter out data from the image data that is unlikely to include waves (e.g., solid objects, land, etc.), and an analysis at 404 can be performed on only points that are likely to be water and/or a water surface of a body of water.

As another example, techniques such as histogram of oriented gradients (HOG) and graph cut optimization can be used to identify portions of waves in image data. As yet another example, techniques utilizing a Kalman filter can be used to estimate when a wave will collide with an object (e.g., the vessel) using video or a series of still images captured over time.

In some embodiments, process 400 can analyze depth data (e.g., generated based on data generated by a depth sensor, such as depth sensor 72-78) to identify waves using any suitable technique or combination of techniques. For example, process 400 can analyze point cloud data and/or other depth data (e.g., RGBD data) that is based on depth information generated by one or more depth sensors (such as depth sensor 72-78), and can identify waves based on the analysis of the point cloud data or other depth data. In a more particular example, techniques based on the 3D Harris operator; ThrIFT (a 3D extension based on SIFT); NARF, or 3D-SIFT Note that it may be more difficult to identify features on relatively gentle waves (e.g., as water in gentle waves can be expected to be more homogenous). However, gentle waves can also be expected to be much less likely to swamp or capsize a vessel. As waves become more dangerous, the waves can be expected to have more well defined features, and therefore can be expected to be detected more reliably. In such an example, a label associated with points in the point cloud or other depth data can indicate which points are likely to be water and/or a water surface of a body of water, and accordingly may include a wave. Such information can be used to filter out data that is unlikely to include waves (e.g., solid objects, land, etc.), and an analysis at 404 can be performed on only points that are likely to be water and/or a water surface of a body of water.

In some embodiments, information about movement of the vessel (e.g., based on IMU data, based on changes in an orientation of the horizon or other fixed objects in image data, etc.) can be used to estimate a location of a common plane (e.g., a plane of the water surface under calm conditions, a plane at an average height of the water), and wave location can be associated with the common plane. Movement of the vessel and the cameras on the vessel over time can cause apparent movement of waves in a global coordinate system associated with the vessel that is due to a combination of movements of the vessel (e.g., roll, pitch, translation, etc.) and movement of the waves over the surface of the water. Information about movements of the vessel can be used to adjust apparent motion of the waves to account for independent motion of the vessel, and movement of the waves can be more reliably tracked over time.

As another example, in some embodiments, process 400 can determine a height of water at one or more particular distances (e.g., from a particular image sensor, from vessel, etc.) over time, and can generate a profile of the water height at each particular distance (e.g., a 1D profile of height over time). In such an example, process 400 can analyze a predetermined portion of the profile to identify waves represented in the profile based on the heights in the profile (e.g., one minima and one maxima in the profile can represent a wave that passed the particular distance). In such an example, additional information about the wave can be determined, such as a wavelength, a period, a velocity, etc. In some embodiments, process 400 can use a line fitting technique to fit a curve to the profile (e.g., a sinusoid), and can determine properties of the waves based on properties of the fitted curve.

As yet another example, in some embodiments, process 400 can identify waves in a slice of depth data (e.g., from point cloud data, depth map data, etc.). In such an example, process 400 can generate a profile of water height at a particular moment in time (e.g., by sampling the depth data along a particular line or strip in the depth data generated at a particular point in time), which can be, for example, a 1D profile of height from one distance from the vessel and/or depth sensor to another distance from the vessel and/or depth sensor (e.g., an axial distance from a particular depth sensor, a radial distance from a particular portion of the marine vessel), or a particular length within an environment (e.g., a line parallel to a long axis of the vessel, a line parallel to a short axis of the vessel, a line at an oblique angle to a long axis and/or short axis of the vessel, etc.). In such an example, process 400 can analyze the profile to identify waves represented in the profile based on the heights in the profile (e.g., one minima and one maxima in the profile can represent a wave at a particular location along the line being analyzed). In such an example, depth data within a patch of depth data can be aggregated into a slice of depth data (e.g., a 1D slice) by averaging height information across one dimension (e.g., a lateral dimension). In some embodiments, process 400 can use a curve fitting technique to fit a line to the profile (e.g., a sinusoid), and can determine properties of the waves based on properties of the fitted curve. In some embodiments, different slices that correspond to various headings can be analyzed, and a slice that results in a largest wave amplitude and/or a shortest wavelength can be used to determine wave heights, as a slice that falls closest to a heading of the waves can be expected to have a shortest wavelength. In some embodiments, if multiple prevailing wave directions are present with amplitude exceeding the threshold, process 400 can identify a heading that is likely to maximize safety and/or occupant comfort.

As still another example, process 400 can identify waves in a patch of depth data (e.g., from point cloud data, depth map data, etc.). In such an example, process 400 can generate a 2D profile of water height at a particular moment in time (e.g., by sampling the depth data within a predetermined volume of the depth data at a particular point in time), which can be, for example, a 2D profile of height within an area of the environment of the vessel (e.g., a spherical volume, a cylinder, a cuboid, etc.), which or may not include an area occupied by the marine vessel. In such an example, process 400 can analyze the 2D profile to identify waves represented in the profile based on the heights in the profile. In such an example, depth data within smaller patches of the depth data patch can be aggregated into a cell representing a height of the water within the smaller patch by averaging height information included in the 2D area enclosed within the smaller patch. In some embodiments, process 400 can use a line fitting technique to fit a surface to the profile (e.g., a 2D sinusoid), and can determine properties of the waves based on properties of the fitted surface.

At 406, process 400 can determine a height of one or more waves identified at 404 using any suitable technique or combination of techniques. In some embodiments, process 400 can determine a height of a wave based on a location (e.g., a location along the ±z axis, an x,y,z location, etc.) of a point corresponding to a trough of the wave, and a location of a point corresponding to a crest of the wave. In such embodiments, process 400 can determine a height of the wave based on a difference between the location of the trough and the location of the crest (e.g., a difference between the z-axis locations of the points).

Additionally or alternatively, in some embodiments, process 400 can determine a height of a wave based on a location (e.g., a location along the x/y plane, an x,y,z location, etc.) of a point corresponding to a trough of the wave and/or a location of a point corresponding to a crest of the wave, and a size of a face of the wave that is visible in the image data (e.g., in pixels). In such embodiments, process 400 can use the distance to the wave and the size of the face to estimate a height of the wave, and/or a difference between the distance to the trough and the crest of the wave and the size of the face of the wave.

Additionally or alternatively, in some embodiments, process 400 can determine a height of the wave based on a fitted curve or surface (e.g., based on an amplitude of a 1D or 2D sinusoid fitted to the depth data).

If process 400 determines that the height of one or more of the waves does not exceed a threshold height ("NO" at 408), process 400 can return to 402. In some embodiments, any suitable threshold height can be used to determine whether the identified wave(s) have the are potential to swamp the marine vessel. For example, in some embodiments, the threshold can be a portion of a minimum gunwale height of the marine vessel (e.g., 90% of the gunwale height, 80% of the gunwale height, etc.). In some embodiments, a gunwale height of the marine vessel can stored in any suitable memory accessible by a processor (e.g., processor 224 of sensor processor 70, CCM 24, etc.).

Otherwise, if process 400 determines that the height of one or more of the waves exceeds the threshold height ("YES" at 408), process 400 can move to 410.

At 410, process 400 can determine whether a current heading of the marine vessel is within a predetermined angle of the incoming wave or waves that are over the threshold height. In some embodiments, process 400 can determine a heading of a wave or a group of waves that is over the threshold height using any suitable technique or combination of techniques. For example, process 400 can use image data and/or depth data from multiple points in time to determine a direction in which the wave(s) is propagating, and/or a speed at which the wave is propagating. In some embodiments, process 400 can represent a heading and/or a speed of a wave using a vector in which the direction of the vector can represent a heading and the magnitude of the vector can represent speed. Alternatively, process 400 can represent a heading of a wave(s) using a unit vector, and can represent speed of the wave using a scalar coefficient. In some embodiments, an average heading of a group of waves can be determined based on an average of the heading of waves in the group of waves.

In some embodiments, process 400 can determine that the heading of the marine vessel is within a predetermined angle of the incoming wave(s) with a height over the threshold based on the heading of the vessel and the heading of the waves. In some embodiments, the predetermined angle can be any suitable angle, such as within 5°, 7.5°, 10°, 12.5°, 15°, etc. For example, if the wave heading is 0° and the vessel heading is in a range of 170° and 190° (e.g., using a 10° predetermined angle), process 400 can determine that the heading of the marine vessel is within the predetermined angle of the incoming wave(s), and if the vessel heading is any other heading outside that range, process 400 can determine that the heading of the marine vessel is not within the predetermined angle of the incoming wave(s). In some embodiments, if only the axis of travel can be reliably determined from image data, and direction of travel is ambiguous, other data, such as IMU data associated with recent waves passing the vessel, can be used to estimate a direction of travel of the waves (e.g., based on the heading of the vessel and how the vessel changed pitch and/or roll as a leading edge of the wave(s) passed).

In some embodiments, the predetermined angle can vary based on one or more factors. For example, the predetermined angle can be reduced as the height of the waves over the threshold increases. As another example, a user can provide input indicating that a smaller predetermined angle is to be used (e.g., by indicating that comfort is more important to the user than fuel expenditure). As yet another example, the predetermined angle can be increased if the vessel is underway, as an operator is more likely to be able to respond to a dynamic situation, but may want to automatically take action if there is a relatively large risk (e.g., relatively large waves coming toward the marine vessel at a relatively large angel). As still another example, the predetermined angle can be smaller if the marine vessel is performing an autonomous station keeping function, as the marine vessel is relatively likely to be performing somewhat regular heading and/or position adjustments. As a further example, the predetermined angle can be larger if the marine vessel is physically anchored at an anchor point (e.g., using a mooring ball, or an anchor), as it may be more resource intensive to make large heading changes when the marine vessel is tied up (e.g., to avoid fouling a propeller on the anchor line, mooring lines, etc.).

In some embodiments, image data (e.g., from one or more depth sensors 72-78) can be provided as an input to one or more processors (e.g., a processor of sensor processor 70) that process the image data to generate an image, make comparisons with previously generated images, identify patterns in the imaging data or images, and/or detect objects within the imaging data or images. Comparing a sequence of image data acquired at two or more instances in time can facilitate process 400 determining a direction in which an object (e.g., a wave) identified within this image data is moving relative to the marine vessel over time. For example, a change in pixel location(s) for a feature of a given object (e.g., a particular portion of a wave such as a crest or trough, an edge of the object, a light at the bow of a marine vessel, a pillar supporting a windshield of a marine vessel), along with knowing the distance to that feature at each instance, can be used to determine a direction in which the object is traveling relative to the sensors, and thus relative to the marine vessel. Changes in the movement of the object can further be analyzed to determine the speed, velocity, acceleration, and/or a path of travel for the object over time. Additionally, such information can be used to estimate an angle and/or a time at which a wave is expected to impact the marine vessel. In some embodiments, such information can be used to determine a heading of the object, such as a cardinal direction.

If process 400 determines that the current heading of the marine vessel is appropriate for the incoming wave(s) ("YES" at 412), process 400 can return to 402.

Otherwise, if process 400 determines that the current heading of the marine vessel is not appropriate for the incoming wave(s) ("NO" at 408), process 400 can move to 414.

At 414, process 400 can cause one or more propulsion devices and/or one or more control surfaces of the marine vessel to be controlled to adjust a heading of the marine vessel to a more appropriate heading. In some embodiments, process 400 can cause the heading of the marine vessel to be adjusted to any suitable heading that reduces a risk of the vessel being swamped and/or capsized by the wave(s) identified at 404 and/or determined to be over the threshold height at 408. For example, process 400 can cause a heading of the marine vessel to be adjusted to an optimal heading (e.g., a heading aligned with a heading of the waves, such as a heading that is opposite of the heading of the waves). In such an example, process 400 can provide an instruction and/or request to adjust a heading to a requested heading (e.g., the optimal heading) to any suitable controller (e.g., CCM 24, PCMs 26a, 26b, etc.).

As another example, process 400 can cause a heading of the marine vessel to be adjusted to an a heading that is within a predetermined angle of the heading of the wave(s), such as the predetermined angle used at 412.

In some embodiments, process 400 (and/or any other suitable process, such as an autonomous control process) can control the one or more propulsion devices and/or control surfaces to adjust the heading of the marine vessel to a requested heading (e.g., based on the heading of the wave(s)). Note that the marine vessel may not be able to safely adjust the heading to the requested heading, for example, due to objects obstructing the marine vessel from changing its heading.

In some embodiments, a user can be required to allow vessel 10 to automatically use a propulsion device (e.g., an outboard motor) to adjust a heading of vessel 10. For example, in some embodiments, a user can place the vessel into a mode in which vessel 10 is permitted to use a propulsion device to generate thrust (e.g., via a propeller) to mitigate risks from changes in weather conditions. In such embodiments, a user can be warned that allowing autonomous operation can endanger human life (e.g., of swimmers or occupants of the vessel that may fall overboard), and can require the user to acknowledge the risk prior to permitting autonomous operation of the propulsion device(s). In some embodiments, vessel 10 can be permitted to attempt to adjust a heading using a control surface (e.g., a rudder, a propulsion device that is not generating thrust, etc.) without warning a user, as changing an angle of a control surface can generally be accomplished without endangering humans that may be in the water near the vessel.

In some embodiments, the vessel can attempt to change the heading of the vessel using a control surface (e.g., a rudder, an outboard motor that is off or in neutral, etc.) prior to operating a propulsion device to change the heading. If the vessel can adjust the vessel to the desired heading and maintain the desired heading using only the control surface (e.g., for a predetermined period of time), the vessel may not need to operate the propulsion device. This can reduce an amount of fuel and/or energy used to adjust the heading and increase the safety and/or comfort of occupants of the vessel.

Additionally or alternatively, in some embodiments, at 414, process 400 can cause an indication (e.g., a warning, a notification, etc.) to be presented (e.g., via a multi-function display) that one or more potentially dangerous waves have been detected, and/or an indication of a direction from which the wave(s) is approaching the vessel. In some embodiments, such an indication can prompt an operator to adjust a heading of the vessel (e.g., process 400 can omit autonomously controlling any propulsion devices or control surfaces to adjust a heading of the marine vessel at 414). Additionally or alternatively, in some embodiments, a selectable user interface element can be presented in connection with the indication, and selection of the selectable user interface element can authorize the marine vessel to autonomously adjust a heading while potentially dangerous waves are detected.

In some embodiments, the more appropriate heading can be determined, at least in part, based on a direction and/or angle at which waves are impacting the marine vessel. As described above, a direction and/or angle of the waves can be determined via image processing techniques. It is generally safest and most comfortable for a marine vessel to have a heading such that waves impact no more than 45° from the bow or stem, with additional consideration for the size and velocity of both the marine vessel and the waves. As a hull of a marine vessel is often designed for smooth and stable navigation when propelled forwardly, a difference between a heading of the bow and a heading of the wave of about 45° or less are generally safer and more comfortable than waves that are incident at larger angles. Note that in some conditions an appropriate heading may be different, such as when the vessel is under way and a heading into the waves may increase a risk of porpoising (e.g., causing the vessel to "bounce" in the water). In such an example, an appropriate heading may be closer to parallel to a crest of the wave, steering into the waves at a shallower angle.

Figure 5:
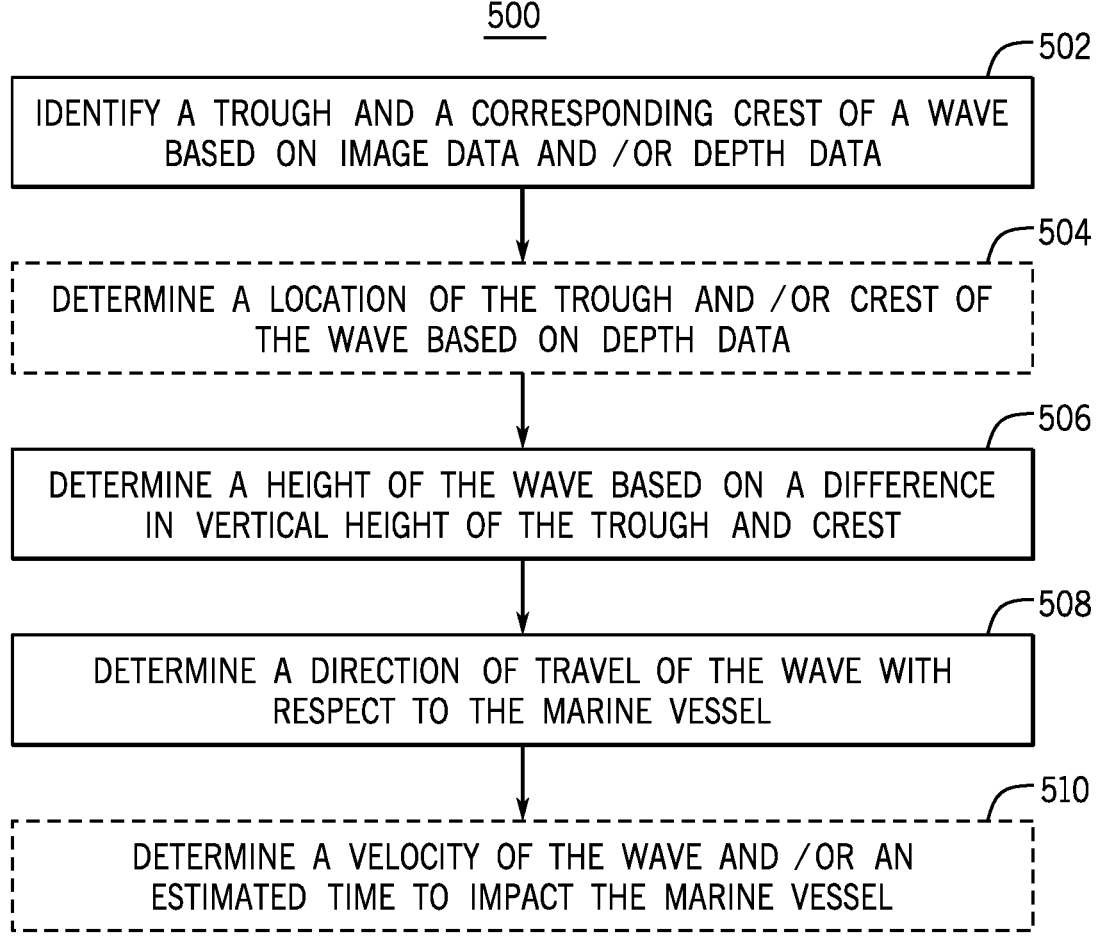
FIG. 5 shows an example of a process for detecting waves using a vision system of a marine vessel in accordance with some embodiments of the disclosure.

FIG. 5 shows an example of a process 500 for detecting waves using a vision system of a marine vessel in accordance with some embodiments of the disclosure.

At 502, process 500 can identify a trough and a corresponding crest of a wave based on image data and/or depth data (e.g., image data and/or depth data received at 402)

using any suitable technique or combination of techniques. In some embodiments, process 500 can use one or more techniques described above in connection with 404 of FIG. 4 to identify a trough and/or crest of a wave.

At 504, process 500 can determine a location associated with the trough and/or a location associated with the crest of the wave based on depth data (e.g., depth data received at 402). In some embodiments, process 500 can use image data and/or associated depth data to identify a location (e.g., an x,y,z location) of the trough and/or crest. For example, if 2D image data is used to identify a wave, a point in the image data corresponding to the trough and/or crest can be used to correlate the image data to depth data. In some embodiments, 504 can be omitted, for example, if the location of the trough and/or crest is determined as part of identifying the wave, and/or if the wave is identified from 3D data.

At 506, process 500 can determine a height of the wave based on a difference in vertical height of the trough and the associated crest. For example, process 500 can determine a difference between the z-axis location of the trough and crest.

At 508, process 500 can determine a direction of travel (e.g., a heading) of the wave with respect to the marine vessel. In some embodiments, process 500 can determine a heading of the wave(s) based on movement in the trough and/or crest over time. For example, process 500 can track a particular portion of a trough and/or crest over time, and determine the heading based on the direction of movement of the trough and/or crest over time. Additionally or alternatively, in some embodiments, process 500 can determine a heading of the wave(s) based on a shape of the waves. For example, process 500 can identify a direction along which the trough and/or crest run, and can determine the heading as a direction orthogonal to the direction along which the trough and/or crest run.

At 510, process 500 can determine a speed of the wave and/or an estimated time until the wave will impact the marine vessel. In some embodiments, process 500 can determine a speed of the wave(s) based on movement in the trough and/or crest over time. For example, process 500 can track a particular portion of a trough and/or crest over time, and determine a speed of the wave based on how far that portion of the trough and/or crest moved during a predetermined period of time. As another example, process 500 can determine a time that it takes a particular wave to travel a predetermined distance. In such an example, process 500 can monitor a height of waves at two particular points along a heading of the waves, and can determine a speed of the wave(s) based on the distance between the two points and an amount of time that passes between the wave being detected at the first point and the second point.

In some embodiments, 510 can be omitted, for example, if the speed of the waves is not used to determine whether to adjust a heading of the vessel. For example, if the vessel is adjusted based on an average heading of a wave(s) that is above a threshold, a heading of the vessel can be adjusted regardless of when the waves are projected to pass the vessel. Alternatively, if the vessel is adjusted based on the heading of individual waves (e.g., when both primary and secondary waves have a height above the threshold height), a heading of the vessel can be adjusted based on the timing at which the waves are estimated to arrive at the vessel (e.g., if the time between waves is long enough to adjust the heading appropriately).

Figure 6:
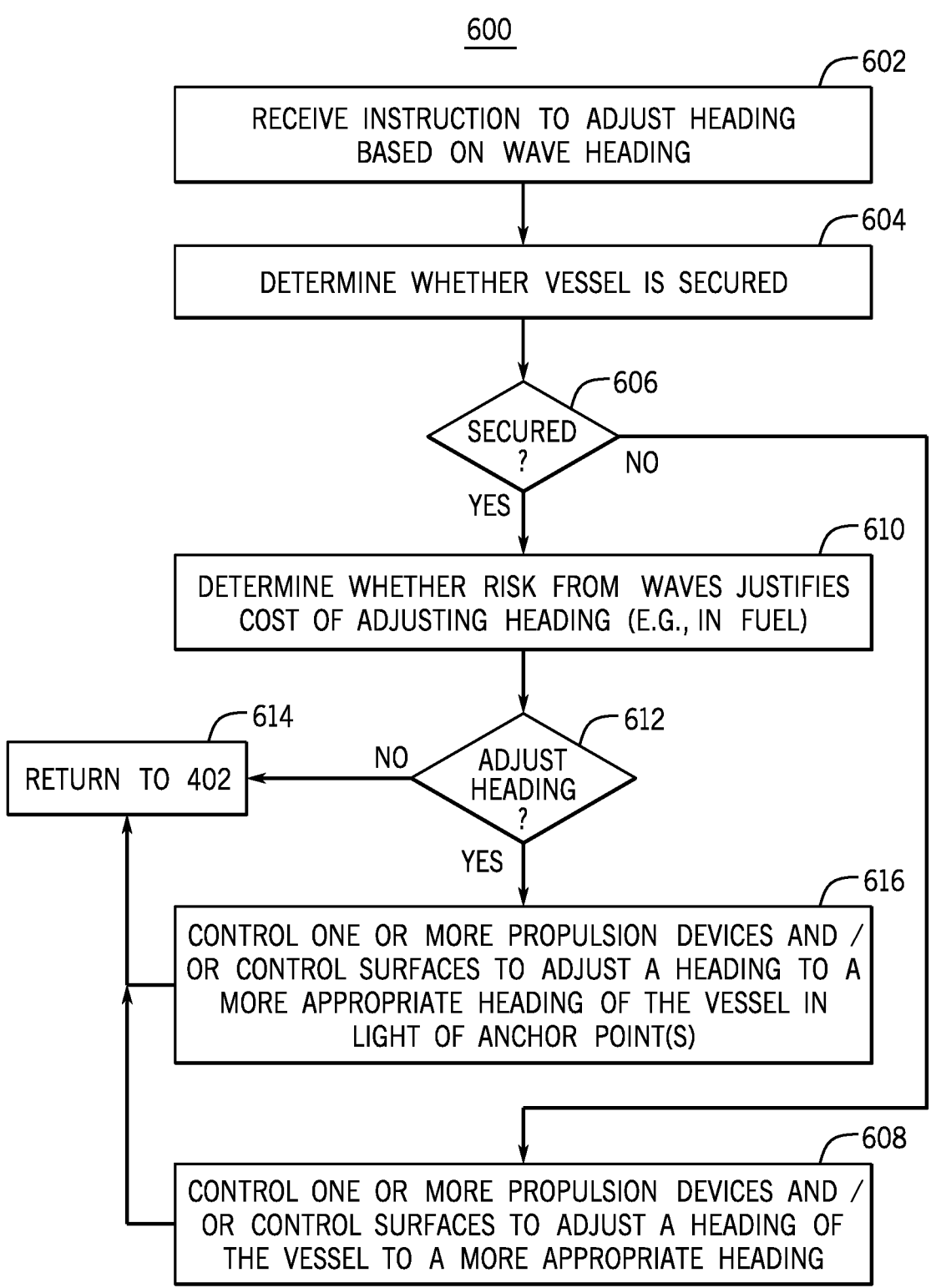
FIG. 6 shows an example of a process for adjusting a heading of a marine vessel based on detected waves in accordance with some embodiments of the disclosed subject matter.

FIG. 6 shows an example of a process 600 for adjusting a heading of a marine vessel based on detected waves in accordance with some embodiments of the disclosed subject matter.

At 602, process 600 can receive an instruction to adjust a heading of the marine vessel based on a wave heading of one or more waves approaching the marine vessel. In some embodiments, the instruction can be received from any suitable source, such as a sensor processor (e.g., sensor processor 70) or central controller (e.g., CCM 24) executing a process for detecting waves (e.g., at least a portion of process 400 described above in connection with FIG. 4). For example, such an instruction can be automatically generated when the vessel is in a mode in which it is authorized to adjust a heading if one or more potentially dangerous waves are detected. Additionally or alternatively, in some embodiments, the instruction can be received as input to a user interface element (e.g., a selectable user interface element) authorizing adjustment of the heading (e.g., a user interface element presented via a display when one or more potentially dangerous waves are detected).

At 604, process 600 can determine whether the vessel is secured using any suitable technique or combination of techniques. In some embodiments, process 600 can use any suitable technique or combination of techniques to determine whether the vessel is secured. A vessel can be secured using a variety of techniques, and can be secured in various ways. For example, a vessel can be secured if the vessel is secured to a dock or mooring ball (e.g., the vessel can be docked or moored) using multiple anchor points (e.g., at a dock) or a single anchor point (e.g., at a mooring ball). As another example, a vessel can be secured if an anchor of the vessel has been deployed (e.g., the vessel can be anchored). In some embodiments, a vessel that is secured can still move within a relatively small area (e.g., an area around a mooring ball or anchor) and can change heading (e.g., due to wind), or can be more tightly constrained (e.g., when secured using multiple anchor points on a dock) and cannot change heading. Note that a vessel can be secured in other ways, such as if the vessel is tied up to any suitable structure or is beached. In some embodiments, a vessel that is not being operated can be in a secured state in which movement of the vessel is constrained, or in an unsecured state in which movement of the vessel is not constrained (e.g., the vessel can be adrift). Note that this can be distinguished from when the vessel is being operated and it may be placed into a state in which the vessel autonomously maintains a relatively consistent location and/or heading (e.g., a station keeping mode). In such a state, propulsion devices and/or other devices of the vessel can be operated (e.g., by a user, by a controller, etc.) to maintain a relatively fixed position and/or heading.

In some embodiments, process 600 can determine that the vessel is secured based on input from a user (e.g., via a hardware-based user interface element, via a software-based user interface element presented via a touchscreen such as an MFD, via a mobile device such as a smartphone or tablet computer, etc.). In some embodiments, a user can provide input indicating how the vessel is secured (e.g., to a mooring ball, to a dock, via an anchor, etc.).

Additionally or alternatively, in some embodiments, process 600 can determine whether the vessel is secured based on data generated by one or more depth sensor devices, and/or other input devices (e.g., a non-depth sensing digital imaging device, a GPS receiver, one or more IMUs, a motor and/or sensor associated with deploying an anchor such as via a windlass, etc.), when the vessel is not being actively operated (e.g., by a user and/or by a controller) and/or has likely been secured (e.g., by deploying an anchor via an automated or manual windlass associated with a sensor in communication with a controller).

If process 600 determines that the vessel is not secured ("NO" at 606), process 600 can move to 608.

At 608, process 600 can control one or more propulsion devices and/or control surfaces of the vessel to adjust a heading of the vessel to a more appropriate heading using any suitable technique or combination of techniques. For example, process 600 can use techniques described above in connection with 414 to adjust a heading of the vessel.

Otherwise, if process 600 determines that the vessel is secured ("YES" at 606), process 600 can move to 610.

At 610, process 600 can determine whether a risk from the identified wave(s) justifies a cost of adjusting a heading (e.g., a cost in fuel, a cost in time, etc.). In some embodiments, process 600 can estimate an amount of fuel, energy, and/or time that is likely to be used to adjust a heading of the vessel based on the heading of the wave(s) and one or more constraints that the vessel being secured places on movement of the marine vessel and/or one or more constraints that objects in the environment place on movement of the marine vessel. For example, the vessel can be constrained from moving more than a predetermined distance from a mooring ball or other anchor point. As another example, the vessel can be constrained from performing certain maneuvers that may foul a propulsion device with a line being used to secure the vessel (e.g., an anchor line).

In some embodiments, process 600 can estimate an amount of fuel, energy, and/or time that is likely to be used to adjust a heading of the vessel using any suitable technique or combination of techniques. For example, in some embodiments, process 600 can calculate (or can request that an autonomy system calculate) a relatively short-term path based on a current location and heading of vessel 10, a desired heading, and the constraints on movement of the vessel imposed by the vessel being secured and any objects in a vicinity of the vessel. In some embodiments, process 600 (and/or a controller(s) of an autonomy system) can determine one or more potential paths, and can compare a cost of the paths (e.g., to each other) to determine which path to traverse to reach the desired heading. In some embodiments, any suitable information about the environment can be used when planning the path. For example, an occupancy grid that has been generated and/or updated using proximity information measured by depth sensors (e.g., depth sensors 72-78) can be used for path planning.

In some embodiments, if a risk presented by an incoming wave(s) is relatively low (e.g., based on by how much the wave height exceeds a threshold wave height, based on how many waves are approaching, etc.) and the cost of adjusting the heading is relatively high (e.g., there are relatively nearby objects that the vessel may collide with such as swimmers, adjusting a heading is expected to cause the motor to operate at more than 35% throttle for more than 3 of every ten minutes, if the battery state of charge of an electric vehicle is below about 40%, etc.). process 600 can determine that the heading adjustment is not justified by the risk presented by the incoming wave(s). Alternatively, if a risk presented by an incoming wave(s) is relatively high (e.g., based on the wave height exceeding the gunwale height by at least a predetermined amount, such as any amount, at least 10 cm, based on a likelihood that the vessel will porpoise in the troughs between waves, etc.), process 600 can determine that the heading adjustment is justified by the risk presented by the incoming wave(s) unless there is a mitigating factor (e.g., the cost in fuel, time, or energy is very high, a more dangerous wave is approaching on a different heading, etc.).

Note that an evaluation of risk and cost can be carried out if the vessel is not secured ("NO" at 606), but the cost of adjusting the heading can be expected to be lower, as there are fewer constraints on movements of the vessel when the vessel is not secured (e.g., when it is underway, when it is in a station keeping mode, when it is adrift, etc.).

If process 600 determines that a heading adjustment is not justified by the risk presented by the wave(s) ("NO" at 612), process 600 can move to 614, and process 600 can end. For example, process 600 can be executed at 414, and process 400 can return to 402 after process 600 ends.

Otherwise, if process 600 determines that a heading adjustment is justified by the risk presented by the wave(s) ("YES" at 612), process 600 can move to 616.

At 616, process 600 can control one or more propulsion devices and/or control surfaces of the vessel to adjust a heading of the marine vessel to a more appropriate heading in light of the presence of one or more anchor points and/or lines between the marine vessel and the one or more anchor points. For example, process 600 can cause a planned path (e.g., with a lowest cost) to be executed (e.g., by a controller of the vessel, such as CCM 24).

Figure 7:
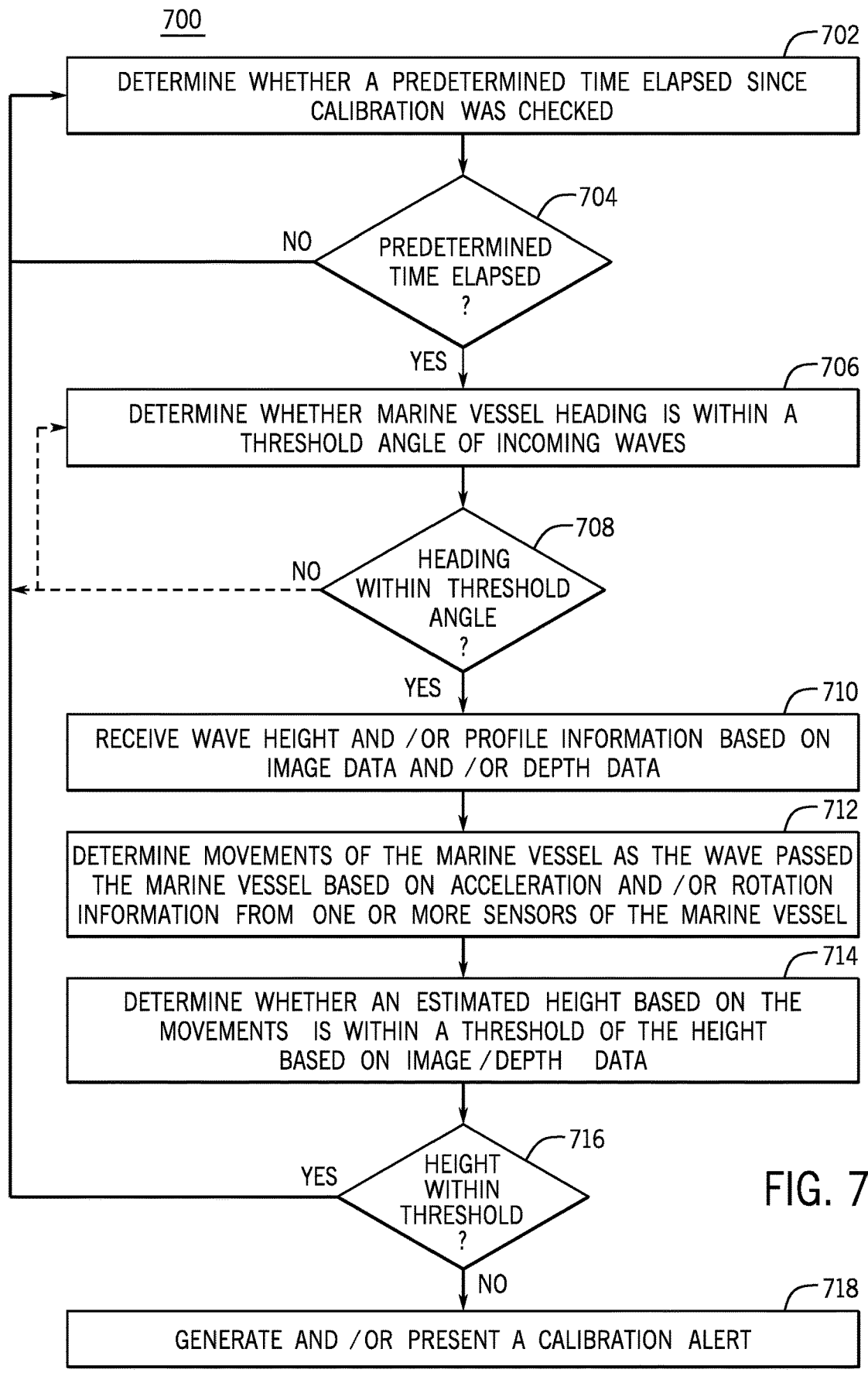
FIG. 7 shows an example of a process for detecting miscalibration of a vision system of a marine vessel based on an estimated wave height and a detected wave height in accordance with some embodiments of the disclosure.

FIG. 7 shows an example of a process 700 for detecting miscalibration of a vision system of a marine vessel based on an estimated wave height and a detected wave height in accordance with some embodiments of the disclosure.

At 702, process 700 can determine a predetermined time has elapsed since calibration of one or more depth sensors has been checked based on wave height. In some embodiments, the predetermined time can be any suitable amount of time. For example, the time can be one minute, multiple minutes (e.g., 10, 20, 30, etc.), one hour, multiple hours (e.g., 2, 3, 4, 5, 6, etc.), one day (e.g., 24 hours), multiple days, one week, etc. Additionally, in some embodiments, each depth sensor can be associated with a time that has elapsed since calibration of that depth sensor was checked based on wave height. For example, each depth sensor may have a limited FOV, which may not include a wave at a suitable heading with respect to the vessel at any given time. Accordingly, in some embodiments, each depth sensor can be associated with an individual time indicating when that depth sensor calibration was last checked based on wave height.

In some embodiments, if the predetermined time has elapsed, and the marine vessel was not on an appropriate heading with respect to the waves at the time it elapsed (e.g., "NO" at 708), process 700 can wait a second predetermined time to check again at 706 (e.g., which can be the same period of time, or a shorter period of time than the predetermined period of time).

If process 700 determines that a predetermined time has not elapsed ("NO" at 704), process 700 can return to 702. For example, if the predetermined time has not elapsed, process 700 can continue to wait, even if the conditions under which calibration can be checked based on wave height are present (e.g., "YES" at 708).

Otherwise, if process 700 determines that a predetermined time has elapsed ("YES" at 704), process 700 can move to 706.

At 706, process 700 can determine whether a heading of the marine vessel is within a threshold angle of the heading of incoming waves using any suitable technique or combination of techniques. For example, as described above in connection with 410 of FIG. 4, process 400 can determine whether a current heading of the marine vessel is relatively close to a heading of incoming waves.

In some embodiments, process 700 can wait for appropriate conditions (e.g., when the heading of the boat is relatively closely aligned with the heading of the waves) before checking the calibration of a depth sensor, as a relationship between pitch of the vessel as a wave passes along a length of the vessel and wave height (e.g., when the vessel heading is point relatively close to the direction from which the waves are coming) is generally more predictable than a relationship between roll of the vessel as a wave passes from a larger angle (e.g., from a heading that is in a range of about 45° to about 135° different than a heading of the vessel), as roll can depend on individual characteristics of the vessel (e.g., hull shape can impact roll behavior, with a pontoon being generally less likely to experience roll than a tri-hull, which is generally less likely to experience roll than a deck boat, which is generally less likely to experience roll than a runabout, which is generally less likely to experience roll than a speedboat, etc.; additionally the deadrise of a vessel can impact sensitivity to roll, with less deadrise generally being associated with greater propensity to roll). In some embodiments, process 700 can generate and/or refine a model relating roll or pitch and roll of the vessel to wave height based on data gathered as waves pass the vessel and cause the vessel to roll (e.g., waves that have a height estimate from the depth sensors that is likely to be reliable, such as when the calibration of a depth sensor that was used to estimate the height was recently confirmed to be relatively accurate).

In some embodiments, a heading of the vessel can be automatically adjusted to be relatively closely aligned with a heading of the waves, which can facilitate collecting pitch data that can be used to check a calibration of the depth sensor. For example, if the waves are relatively high, the vessel heading may be adjusted via another process (e.g., process 400 described above in connection with FIG. 4). As another example, if it has been an extended period of time since a particular depth sensor calibration was evaluated, process 700 can cause the vessel heading to be adjusted (e.g., with an operators permission, if the adjustment would be relatively small and an autonomy system is operating the vessel, etc.) for the purpose of checking the calibration.

If process 700 determines that the marine vessel heading is not within the threshold angle of the wave heading ("NO" at 708), process 700 can return to 706 and/or 702. For example, process 700 can return to 706 to wait for the heading of the vessel to come into alignment with the wave heading (e.g., due to environmental conditions changing). As another example, process 700 can return to 702 to wait some additional amount of time before returning to 706.

Otherwise, if process 700 determines that the marine vessel heading is within the threshold angle of the wave heading ("YES" at 708), process 700 can move to 710.

At 710, process 700 can receive a wave height and/or profile information based on image data, and/or depth data from one or more cameras and/or depth sensors. For example, process 700 can receive wave height determined at 406 of FIG. 4. In some embodiments, process 700 can receive multiple height estimates for the same wave, as multiple depth sensors may include the wave in that sensors FOV.

At 712, process 700 can determine movements (e.g., pitch, roll, lateral accelerations, etc.) of the marine vessel as the wave passed the marine vessel based on acceleration information and/or rotation information from one or more sensors of the marine vessel. For example, process 700 can receive IMU data indicative of a change in posture of the vessel over time along one or more axes (e.g., corresponding to translational acceleration) and/or about one or more axes (e.g., corresponding to rotation), and can correlate the change in posture to a time period when the wave passed the vessel (e.g., based on the speed of the wave). In such an example, process 700 can determine a maximum pitch experienced by the vessel. In some embodiments, any suitable technique or combination of techniques can be used to estimate a wave height based on a pitch experienced by the marine vessel as the wave passed the marine vessel. For example, in some embodiments, process 700 can use a model of the vessel to estimate a height of a wave that passed the vessel based on the pitch experienced by the vessel. In such an example, process 700 can integrate IMU acceleration over time to determine velocity over time, and can approximate wave height (e.g., based on vertical displacement) based on the velocity (e.g., an integral of velocity).

At 714, process 700 can determine whether an estimated height of the wave based on the movements experienced by the marine vessel as the wave passed the marine vessel is within a threshold range of the height of the same wave based on image/depth data. Note that pitch alone may not be sufficient to reliably estimate a height of the wave, as wave speed and frequency can cause a vessel to experience a different pitch over two waves with the same height. Additionally, for example, movement of occupants and/or gear (e.g., caused by the wave passing the vessel) can impact pitch, as well as how the vessel is controlled when underway (e.g., based on trim angle, commanded acceleration, etc.). As described above, additional acceleration data (e.g., 3-axis acceleration data) can be used to more reliably estimate wave height. Additionally or alternatively, process 700 can estimate a pitch that the marine vessel is expected to experience based on the shape of the wave (e.g., a wavelength and a height of the wave, a profile of the wave, etc.) determined based on data from the depth sensor(s), and can determine whether a pitch experienced by the marine vessel as the wave passed the marine vessel is within a threshold range of a predicted pitch of the vessel based on the height of the same wave determined from image/depth data.

Additionally or alternatively, in some embodiments, process 700 can determine whether an estimated height of the wave based on the pitch and roll experienced by the marine vessel as the wave passed the marine vessel is within a threshold range of the height of the same wave based on image/depth data. Additionally or alternatively, process 700 can estimate a pitch and roll that the marine vessel is expected to experience based on the height and heading of the wave determined based on data from the depth sensor(s), and can determine whether a pitch and roll experienced by the marine vessel as the wave passed the marine vessel is within a threshold range of a predicted pitch and roll of the vessel based on the height of the same wave determined from image/depth data. For example, if the pitch experienced by the marine vessel is within about 25% of the pitch of the wave determined from the image/depth data, process 700 can determine that the pitch is within the threshold range of the predicted pitch.

If process 700 determines that the height estimated based on the pitch is within the threshold range of the height of the same wave based on image/depth data ("YES" at 716), process 700 can return to 702. In some embodiments, process 700 can record (e.g., in memory) a time at which the determination was made (and for which depth sensor(s)), which can be used to determine whether a predetermined time has elapsed at 702.

Otherwise, if process 700 determines that the height estimated based on the pitch is not within the threshold range of the height of the same wave based on image/depth data ("NO" at 716), process 700 can move to 718.

At 718, process 700 can generate and/or present a calibration alert and/or cause a prompt to be presented to a user indicating that calibration of the visions system may have significantly degraded (e.g., indicated by inconsistency between an estimated wave height/vessel pitch based on image data and a wave height/vessel pitch based on IMU data). In some embodiments, process 700 can use any suitable technique or combination of techniques to generate a calibration alert, such an alert can be in any suitable format, and/or such an alert can be provided to any suitable controller and/or location in memory. For example, the calibration alert generated at 718 can be formatted as a message (e.g., from sensor processor 70 to central controller 24) that indicates that calibration of at least one depth sensor has likely significantly degraded, and/or an indication that one or more autonomous navigation features are to be disabled. Such a message can be an asynchronous message, or can be included in a synchronous transmission. As another example, the calibration alert can be formatted as a flag in a message that is sent periodically (e.g., at regular and/or irregular intervals). In a more particular example, such a flag can be set to a first value if the measurements of various fixed points are consistent, and can be set to a second value if the measurements of various fixed points are not consistent. In some embodiments, an alert generated at 718 can include information indicating which depth sensor(s) produced an inconsistent height/pitch estimate, a magnitude of inconsistency, a tolerance that was used, values of the estimated height/pitch, etc.

Additionally or alternatively, at 718, process 700 can cause a prompt to be presented to a user (e.g., via a user interface presented by a display of vessel 10, via a user interface of an application being executed by a computing device of a technician facilitating a calibration procedure, via a user interface of an application being executed by a mobile device paired with vessel 10, via a push notification to a mobile device, via email, via text message, etc.) indicating that calibration of the visions system may have significantly degraded (e.g., indicated by inconsistency between an estimated wave height/vessel pitch based on image data and a wave height/vessel pitch based on IMU data), and/or that use of some autonomous controls may not be safe. In some embodiments, the prompt can include, or otherwise be associated with, an indication that one or more autonomous navigation features have been disabled due to a need for recalibration of the visions system. In some embodiments, a prompt presented at 718 can include information indicating which depth sensor(s) produced inconsistent results, a magnitude of inconsistency, a tolerance that was used, values of the estimated height/pitch, etc.

In some embodiments, subsequent to generating an alert and/or causing a prompt to be presented to a user at 718, process 700 can return to 702. For example, to continue monitoring calibration of the depth sensors.

Additionally, in some embodiments, at 718, process 700 can disable one or more autonomous navigation features and/or autonomous controls. For example, if process 500 determines that the vision system calibration has significantly degraded (e.g., "NO" at 716), process 700 can disable autonomous navigation features and/or autonomous controls, such as automatic docking, automatic navigation, etc.

In such an example, process 700 can leave some autonomous features, such as certain autonomous safety features, enabled.

Further Examples Having a Variety of Features

Implementation examples are described in the following numbered clauses:

1. A method for controlling a marine vessel based on waves detected using a vision system on the marine vessel, the method comprising: receiving image data from a camera, wherein the camera is configured to be mounted to the marine vessel with an associated field of view of an environment of the marine vessel; identifying a wave in the environment of the marine vessel based on the image data; determining that a height of the wave exceeds a threshold; determining that a current heading of the marine vessel is misaligned with a heading of the wave; and automatically adjusting a heading of the marine vessel to align more closely with the heading of the wave.

2. The method of clause 1, further comprising: determining that the current heading of the marine vessel is misaligned with the heading of the wave by more than a threshold angle; and in response to determining that the current heading of the marine vessel is more than ten degrees out of alignment with the heading of the wave, determining that the current heading of the marine vessel is misaligned with the heading of the wave.

3. The method of clause 2, wherein the threshold angle is about ten degrees.

4. The method any one of clauses 1 to 3, wherein the camera comprises a stereoscopic camera.

5. The method any one of clauses 1 to 4, wherein the threshold is based on a height of a gunwale of the marine vessel.

6. The method of clause 1 to 5, comprising a plurality of cameras, including the camera.

7. The method any one of clauses 1 to 6, further comprising: determining whether the marine vessel is secured using a single anchor point; and controlling an angle of one or more steering devices based on a position of the single anchor point with respect to the marine vessel.

8. The method of clause 7, wherein the one or more steering devices comprises a steering actuator that controls an angle of a propulsion device.

9. The method any one of clauses 1 to 8, further comprising: determining a velocity of the wave, wherein the velocity is indicative of a heading of the wave and a speed of the wave.

10. The method any one of clauses 1 to 9, further comprising: controlling an angle of a control surface of the marine vessel, thereby adjusting the heading of the marine vessel to align more closely with the heading of the wave.

11. The method any one of clauses 1 to 10, further comprising: controlling an angle of a propulsion device and thrust provided by the propulsion device, thereby adjusting the heading of the marine vessel to align more closely with the heading of the wave.

12. The method any one of clauses 1 to 11, further comprising: receiving the image data from the camera while the marine vessel is underway.

13. The method any one of clauses 1 to 12, further comprising: receiving additional image data from the camera; identifying a second wave included in the additional image data; estimating a height of the second wave; determining that a current heading of the marine vessel is aligned with a heading of the second wave; receiving one or more values indicative of pitch of the marine vessel during a period of time during which the second wave passed a position of the marine vessel; estimating a height of the second wave based on the one or more values indicative of pitch; determining a difference between the height of the second wave based on the image data and the height of the second wave based on the one or more values indicative of pitch; and in response to determining that the difference exceeds a threshold, generating a calibration alert.

14. A method for monitoring calibration of a vision system on a marine vessel, the method comprising: receiving image data from a camera, wherein the camera is configured to be mounted to the marine vessel with an associated field of view of an environment of the marine vessel; identifying a wave included in the image data; estimating a height of the wave based on the image data; estimating a height of the wave based on one or more values indicative of movements of the marine vessel during a period of time during which the wave passed the marine vessel; determining a difference between the height of the wave based on the image data and the height of the wave based on the one or more values indicative of pitch; and in response to determining that the difference exceeds a threshold, generating a calibration alert.

15. The method of clause 14, further comprising: determining that a current heading of the marine vessel is aligned with a heading of the wave; and estimating the height of the wave based on the one or more values indicative of pitch when the current heading is determined to be aligned with the heading of the wave.

16. A system comprising: one or more processors configured to: perform a method of any of clauses 1 to 15.

17. A non-transitory computer-readable medium storing computer-executable code, comprising code for causing a computer to cause a processor to: perform a method of any of clauses 1 to 15.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIGS. 4 to 7 can be executed or performed in any suitable order or sequence not limited to the order and sequence shown and described in the figures. Also, some of the above steps of the processes of FIGS. 4 to 7 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for controlling a marine vessel based on waves detected using a vision system on the marine vessel, the system comprising:
a camera,
    wherein the camera is configured to be mounted to the marine vessel with an associated field of view of an environment of the marine vessel;
one or more hardware processors configured to:
    receive image data from the camera;
    identify a wave in the environment of the marine vessel based on the image data;
    determine that a height of the wave exceeds a threshold, wherein the threshold is based on a height of a gunwale of the marine vessel;
    determine that a current heading of the marine vessel is misaligned with a heading of the wave; and
    automatically adjust a heading of the marine vessel to align more closely with the heading of the wave.

2. The system of claim 1, wherein the one or more hardware processors are further configured to:
determine that the current heading of the marine vessel is misaligned with the heading of the wave by at least a threshold angle; and
in response to determining that the current heading of the marine vessel is more than ten degrees out of alignment with the heading of the wave, determine that the current heading of the marine vessel is misaligned with the heading of the wave.

3. The system of claim 2, wherein the threshold angle is about ten degrees.

4. The system of claim 1, wherein the camera comprises a stereoscopic camera.

5. The system of claim 1, further comprising a plurality of cameras, including the camera.

6. The system of claim 1, wherein the one or more hardware processors are further configured to:
determine whether the marine vessel is secured using a single anchor point; and
control an angle of one or more steering devices based on a position of the single anchor point with respect to the marine vessel.

7. The system of claim 6, wherein the one or more steering devices comprises a steering actuator that controls an angle of a propulsion device.

8. The system of claim 1, wherein the one or more hardware processors are further configured to:
determine a velocity of the wave,
    wherein the velocity is indicative of a heading of the wave and a speed of the wave; and automatically adjust the heading of the marine vessel to align more closely with the heading of the wave based on the velocity of the wave.

9. The system of claim 1, wherein the one or more hardware processors are further configured to:
control an angle of a control surface of the marine vessel, thereby adjusting the heading of the marine vessel to align more closely with the heading of the wave.

10. The system of claim 1, wherein the one or more hardware processors are further configured to:
control an angle of a propulsion device and thrust provided by the propulsion device, thereby adjusting the heading of the marine vessel to align more closely with the heading of the wave.

11. The system of claim 1, wherein the one or more hardware processors are further configured to:
receive the image data from the camera while the marine vessel is underway.

12. The system of claim 1, wherein the one or more hardware processors are further configured to:
receive additional image data from the camera;
identify a second wave included in the additional image data;
estimate a height of the second wave;
determine that a current heading of the marine vessel is aligned with a heading of the second wave;
receive one or more values indicative of pitch of the marine vessel during a period of time during which the second wave passed a position of the marine vessel;
estimate a height of the second wave based on the one or more values indicative of pitch;
determine a difference between the height of the second wave based on the image data and the height of the second wave based on the one or more values indicative of pitch; and
in response to determining that the difference exceeds a threshold, generate a calibration alert.

13. The system of claim 1, wherein the gunwale height is a minimum gunwale height of the marine vessel, and the threshold is a predetermined portion of the minimum gunwale height.

14. A method for controlling a marine vessel based on waves detected using a vision system on the marine vessel, the method comprising:
receiving image data from a camera,
    wherein the camera is configured to be mounted to the marine vessel with an associated field of view of an environment of the marine vessel;
identifying a wave in the environment of the marine vessel based on the image data;
determining that a height of the wave exceeds a threshold, wherein the threshold is based on a height of a gunwale of the marine vessel;
determining that a current heading of the marine vessel is misaligned with a heading of the wave; and
automatically adjusting a heading of the marine vessel to align more closely with the heading of the wave.

15. The method of claim 14, further comprising:
determining that the current heading of the marine vessel is misaligned with the heading of the wave by more than a threshold angle; and
in response to determining that the current heading of the marine vessel is more than ten degrees out of alignment with the heading of the wave, determining that the current heading of the marine vessel is misaligned with the heading of the wave.

16. The method of claim 15, wherein the threshold angle is about ten degrees.

17. The method of claim 14, further comprising:

determining whether the marine vessel is secured using a single anchor point; and controlling an angle of one or more steering devices based on a position of the single anchor point with respect to the marine vessel.

18. The method of claim 14, further comprising:

controlling an angle of a control surface of the marine vessel, thereby adjusting the heading of the marine vessel to align more closely with the heading of the wave.

19. The method of claim 14, further comprising:

controlling an angle of a propulsion device and thrust provided by the propulsion device, thereby adjusting the heading of the marine vessel to align more closely with the heading of the wave.

20. A system for monitoring calibration of a vision system on a marine vessel, the system comprising:

a camera, wherein the camera is configured to be mounted to the marine vessel with an associated field of view of an environment of the marine vessel;

one or more hardware processors configured to:

receive image data from the camera;

identify a wave included in the image data;

estimate a height of the wave based on the image data;

estimate a height of the wave based on one or more values indicative of movements of the marine vessel during a period of time during which the wave passed the marine vessel;

determine a difference between the height of the wave based on the image data and the height of the wave based on the one or more values indicative of pitch; and in response to determining that the difference exceeds a threshold, generate a calibration alert.

21. The system of claim 20, wherein the one or more hardware processors are further configured to:

determine that a current heading of the marine vessel is aligned with a heading of the wave; and estimate the height of the wave based on the one or more values indicative of pitch when the current heading is determined to be aligned with the heading of the wave.

22. The method of claim 14, wherein the gunwale height is a minimum gunwale height of the marine vessel, and the threshold is a predetermined portion of the minimum gunwale height.

* * * * *